(12) United States Patent
Atluri et al.

(10) Patent No.: US 12,405,801 B2
(45) Date of Patent: Sep. 2, 2025

(54) SCALARIZATION OF INSTRUCTIONS FOR SIMT ARCHITECTURES

(71) Applicant: NVIDIA Corporation, Santa Clara, CA (US)

(72) Inventors: Aditya Avinash Atluri, Redmond, WA (US); Jack Choquette, Palo Alto, CA (US); Carter Edwards, Campbell, CA (US); Olivier Giroux, Santa Clara, CA (US); Praveen Kumar Kaushik, Bengaluru (IN); Ronny Krashinsky, Portola Valley, CA (US); Rishkul Kulkarni, Austin, TX (US); Konstantinos Kyriakopoulos, Weinsberg (DE)

(73) Assignee: NVIDIA Corporation, Santa Clara, CA (US)

( * ) Notice: Subject to any disclaimer, the term of this patent is extended or adjusted under 35 U.S.C. 154(b) by 193 days.

(21) Appl. No.: 18/105,679

(22) Filed: Feb. 3, 2023

(65) Prior Publication Data
US 2024/0118899 A1    Apr. 11, 2024

(30) Foreign Application Priority Data
Oct. 6, 2022  (GR) .............................. 20220100820

(51) Int. Cl.
*G06F 9/38*  (2018.01)
(52) U.S. Cl.
CPC .................................. *G06F 9/3851* (2013.01)
(58) Field of Classification Search
CPC ..................................................... G06F 9/3851
See application file for complete search history.

(56) References Cited

U.S. PATENT DOCUMENTS

| | | | |
|---|---|---|---|
| 6,076,155 A * | 6/2000 | Blomgren | G06F 9/30123 712/225 |
| 2003/0145190 A1 * | 7/2003 | Faraboschi | G06F 9/3842 712/E9.05 |
| 2007/0067607 A1 * | 3/2007 | Jiao | G06F 9/3851 712/215 |
| 2013/0042090 A1 * | 2/2013 | Krashinsky | G06F 9/38885 712/214 |
| 2016/0371093 A1 * | 12/2016 | Chang | G06F 9/3851 |

* cited by examiner

*Primary Examiner* — Farley Abad
(74) *Attorney, Agent, or Firm* — Lowenstein Sandler LLP

(57) ABSTRACT

Apparatuses, systems, and techniques to adapt instructions in a SIMT architecture for execution on serial execution units. In at least one embodiment, a set of one or more threads is selected from a group of active threads associated with an instruction and the instruction is executed for the set of one or more threads on a serial execution unit.

20 Claims, 13 Drawing Sheets

SCALARIZATION OF INSTRUCTIONS FOR SIMT ARCHITECTURES

CROSS-REFERENCE TO RELATED APPLICATIONS

This application claims the benefit of priority to Greek Patent Application No. 20220100820, entitled, "SCALARIZATION OF INSTRUCTIONS FOR SIMT ARCHITECTURES," filed on Oct. 6, 2022, which is incorporated by reference herein in its entirety.

TECHNICAL FIELD

Embodiments of the disclosure generally relate to parallel processing architectures, and more specifically, to improved techniques for executing instructions in a single instruction multiple thread (SIMT) processing architecture.

BACKGROUND

Many computer applications can be accelerated through the use of parallel processing techniques, e.g., where the same instructions can be executed on multiple data elements in parallel. In image and media processing applications, for example, the processing of large sets of pixels, image blocks, and/or vertices can be mapped to different computing threads or processing lanes that can be executed in parallel. For instance, in a single instruction multiple thread (SIMT) processing architecture, a common instruction (or instruction stream) can be executed using a group of processing threads in parallel.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
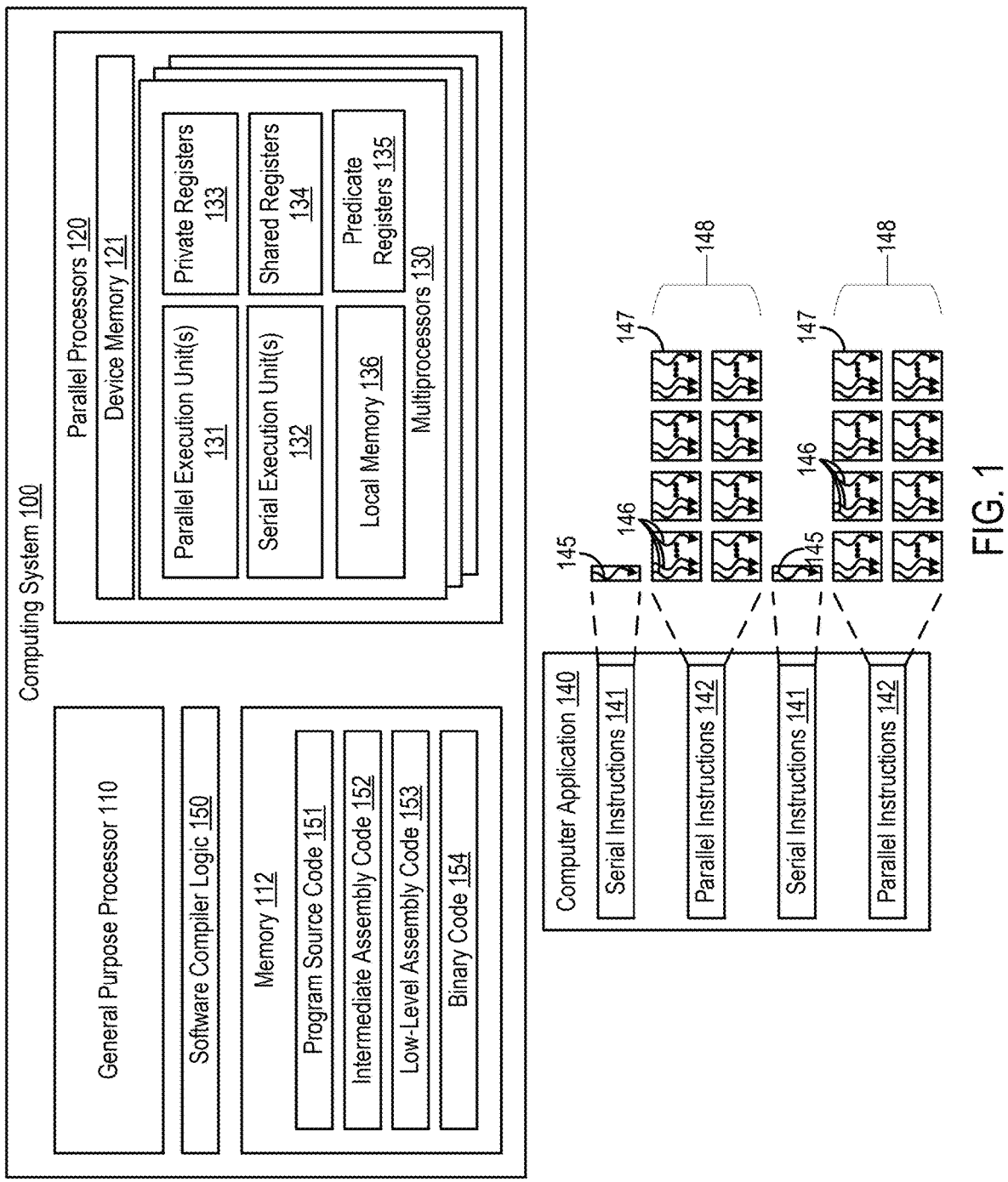
FIG. 1 illustrates an example computing environment, according to at least one embodiment.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

At a high level, in a single instruction multiple thread (SIMT) processing architecture, a common instruction (or instruction stream) can be executed using a group of processing threads in parallel. At a hardware level, the parallel execution of multiple threads is performed using a parallel execution unit, such as an SIMT execution unit (e.g., similar to a traditional vector execution unit). The parallel execution unit, for example, may be able to concurrently perform a variety of different computational operations (e.g., integer and floating-point arithmetic operations, comparison operations, Boolean operations, etc.). Many of these operations may be deterministic in nature (e.g., such as arithmetic and comparison operations) such that performing the operation on a particular set of values is expected to always produce the same result.

In practice, it is often the case that multiple threads concurrently execute the same deterministic instruction on uniform sets of input operands to generate the same result. For example, in graphics processing or finite element analysis applications, computations may be performed on data (e.g., an image or structural model) that exhibit some degree of uniformity (e.g., spatial uniformity in a portion of the image, or temporal uniformity across a series of images). As another example, a counter of a programming loop executed by multiple threads may be incremented following each loop iteration. In such cases, the redundant execution of the instruction using each thread may unnecessarily increase power consumption and resource utilization.

Implementing and/or performing certain compute operations using a parallel execution unit (e.g., a SIMT execution unit) can also be expensive from a silicon use and timing perspective. For example, because compute logic is replicated for each thread lane in a parallel execution unit, implementing complex operations (e.g., tensor memory access (TMA) operations) may require a significant amount of silicon real estate (e.g., significant number of transistors). Furthermore, certain operations may take a substantial amount of time to execute (e.g., several hundreds or thousands of clock cycles) but may only be executed by a few threads at a time, thereby reducing the overall utilization rate of the parallel execution unit.

Embodiments of the present disclosure address the above-mentioned limitations and/or other limitations of existing architectures by adapting a parallel execution model, such as the SIMT execution model, to perform certain operations using a serial execution unit (e.g., similar to a traditional scalar execution unit), capable of executing a single instruction on a single set of input operands. For instance, where multiple threads execute the same deterministic instruction on a uniform set of input operand values, the instruction may be performed using the serial execution unit, with the result being shared with all threads. In this way, greater power efficiency may be achieved—e.g., because the serial execution unit may perform the computation once, and the threads of the SIMT architecture sharing the same instruction may preserve resources by not being required to perform the computation. The serial execution unit, likewise, may implement and perform operations that are too expensive to be provided for, or executed on, a parallel execution unit. This may not only reduce the size and complexity of a parallel execution unit, but also free up the parallel execution unit to perform other operations.

A "scalarization" process may be employed in embodiments to perform this adaptation, where instructions destined for execution using a parallel execution unit (e.g., an SIMT execution unit) are recast for execution by a serial execution unit. The scalarization process may use peeling loops to partition and unwind the execution of threads in a group to be performed (in seriatim, as necessary) on a serial execution unit. For example, in scalarizing instructions that can execute on behalf of multiple threads, the peeling loop may operate to partition a group of threads into sub-groups that exhibit dynamic uniformity for (e.g., all) source operand values, with the instruction for individual sub-groups being collectively executed once using a serial execution unit. As another example, when scalarizing an instruction that is more suitable for serial execution (e.g., instructions that are not supported by, or would be too expensive to implement or execute using, a parallel execution unit), the peeling loop may operate to unwind and execute the instruction on a serial execution unit one thread at a time.

The peeling loops may be further optimized, e.g., by a compiler, to simplify (e.g., reduce the number of iterations necessary, or eliminate needless operations within the loop) or flatten the peeling loop entirely in some instances. The compiler, for instance, may perform uniformity analysis to determine whether source operands share the same value among executing threads. The compiler, likewise, may be able to determine the number of threads that are expected to execute an instruction and simplify the peeling loop accordingly (e.g., eliminating the peeling loop where exactly one thread is expected to execute the instruction).

FIG. 1 is a block diagram illustrating a computing system 100, according to at least one embodiment. In some embodiments, computing system 100 may be a heterogenous computing system that includes one or more types of computational units, including for example, one or more central processing units (CPUs), one or more graphics processing units (GPUs), one or more digital signal processors (DSPs), one or more data processing units (DPUs), one or more field-programmable gate arrays (FPGAs), and/or one or more application specific integrated circuits (ASICs). As illustrated, for instance, computing system 100 may include a general-purpose processor 110 (e.g., a multicore CPU) and a parallel processor 120 (e.g., a general-purpose GPU (GPGPU)).

General purpose processor 110 may be designed for fast serial processing of program instructions, whereas parallel processor(s) 120 may be designed for highly parallel processing of program instructions (e.g., computational instructions). Parallel processor(s) 120 may operate as a coprocessor to the general-purpose processor 110, where portions of a computer application (e.g., data-parallel, compute intensive portions of an application) are off-loaded to the parallel processor 120 for execution.

As an illustrative example, computing system 100 may be used to execute a computer application 140. Computer application 140 may include a collection of program instructions that may include a mix of sequential instruction portions 141, which may be executed as a series of one or more threads 145 on general purpose processor 110, and parallel instruction portions 142, which may be executed in parallel as multiple threads 146 on parallel processor 120. A portion of computer application, for example, may contain programming instructions that are executed many times, but independently on potentially different data, which can be executed as multiple threads 146 on parallel processor 120. The threads 146 may be organized as one or more thread blocks 147 (e.g., as an array or grid 148 of thread blocks 147), which may be concurrently executed by parallel processor 120. In some embodiments, parallel processor 120 may include one or multiprocessors 130, with one or more thread blocks 147 being distributed to each multiprocessor 130 for execution. Individual threads in a thread block 147 can be executed concurrently by multiprocessors 130, and multiprocessors 130 can execute multiple thread blocks concurrently.

In some embodiments, multiprocessors 130 may employ a SIMT (Single-Instruction, Multiple-Thread) architecture for concurrent execution of multiple threads. By way of example, multiprocessors 130 may be configured to create, manage, schedule, and execute threads in groups of parallel threads, which may be referred to as a warp. When multiprocessors 130 are given one or more thread blocks to execute, they may partition them into separate thread groups, which may be independently scheduled for execution.

In some embodiments, multiprocessors 130 may be configured to execute one common instruction for a group of threads at a time (e.g., a warp, half-warp, quarter-warp, etc.). Full efficiency, thus, may be realized when all threads in the group agree on their execution path. Individual threads within a group of threads may start together at a same program address (e.g., a common instruction in a sequence of instructions) but may be assigned their own instruction address counter (or program counter) and register state, allowing each thread to branch and execute independently. If individual threads diverge via a conditional control construct (e.g., a conditional branch, conditional function call, or conditional return), the different branch paths (e.g., resulting from the divergence) may be serially executed. When execution of (e.g., all) branch paths complete, the threads may converge back to the same execution path. In some cases, a program instruction may provide a synchronization point where all threads in the group converge (e.g., where some threads may wait until all threads in the thread arrive). Threads in a group of threads that are participating in the current instruction may be referred to as the active threads, whereas threads not on the current instruction may be referred to as inactive (or disabled) threads.

In some embodiments, multiprocessors 130 may include functional execution units that may be configured to perform a variety of operations, including for example, integer and floating-point arithmetic operations (e.g., addition and multiplication), comparison operations, Boolean operations (AND, OR, XOR), bit-shifting operations, random number generation operations, and other computational operations (e.g., planar interpolation and trigonometric, exponential, and logarithmic functions, etc.). In some embodiments, multiprocessors 130 may include one or more parallel execution unit(s) 131 and serial execution unit(s) 132. Parallel execution units 131 may be configured to execute a single instruction on multiple sets of data (e.g., similar to a traditional vector execution unit). In some embodiments, parallel execution units 131 may be able to execute a common instruction for each thread in a group of threads (e.g., using a distinct set of source operands and resulting in a distinct set of result operands for each thread). Serial execution units 132 may be configured to execute a single instruction on a single set of data (e.g., similar to a traditional scalar execution unit). In some embodiments, serial execution units 132 may be able to execute an instruction for one or more threads (e.g., using a single set of shared source operands and resulting in a single set of shared destination operands for all threads). The operations supported by parallel execution units 131 and serial execution units 132 may vary, with different embodiments including parallel execution units 131 and serial execution units 132 that commonly support certain operations and/or uniquely support other operations. For example, in some embodiments, parallel execution units 131 and serial execution units 132 may commonly support certain arithmetic operations (e.g., integer addition or multiplication operations) and/or other computational operations. As another example, certain memory operations (e.g., TMA operations) may be particularly complex (e.g., requiring significant amount of silicon to implement) and relatively expensive to implement as a parallel execution unit 131. Accordingly, in some embodiments, multiprocessors 130 may support execution of such operations by serial execution units 132.

In some embodiments, multiprocessors 130 may include one or more sets of register files, or registers, for use by the functional execution units of multiprocessors 130. In some embodiments, for example, multiprocessors 130 may include a set of private registers 133 that may provide temporary storage for operands connected to data paths of parallel execution units 131. In some embodiments, private registers 133 may be partitioned and allocated to individual threads in a group of threads being executed by multiprocessors 130, with the allocated portion serving as a private register space of each of the individual threads. In some embodiments, private registers 133 may be statically partitioned (e.g., having a fixed size for each individual thread) and dynamically allocated for use by individual threads. In some embodiments, multiprocessors 130 may include a set of shared registers 134 that may provide temporary storage for operands connected to data paths of serial execution units 132. In some embodiments, shared registers 134 may be accessible by some or all threads in a group of threads being executed by multiprocessors 130.

In some embodiments, multiprocessor 130 may include one or more additional sets of registers. In some embodiments, for example, multiprocessor 130 may include a set of special registers that may store predefined, platform-specific information, such as thread parameters (e.g., a thread identifier (within a thread block), lane identifier (within a warp), warp identifier, block identifier, etc.), clock counters, and/or performance monitoring information. In some embodiments, multiprocessor 130 may include a set of predicate registers 135 that may be used to store predicates (e.g., a 1-bit Boolean value), which may be used to support instruction predication (e.g., conditional branch predication). In some embodiments, for example, an instruction may accept an optional predicate guard operand, which if determined to be true, may cause the instruction to be executed and if determined to be false, may preclude execution of the instruction. In some embodiments, a predicate mask (or predicate vector) may be used as a predicate guard for an instruction to be executed by multiple threads, e.g., with each element of the mask corresponding to a particular thread lane. In some embodiments, for example, a predicate mask may be used to identify active threads in a group of threads (e.g., that are participating in the current instruction) and inactive (or disabled) threads in the group of threads (e.g., that are not performing the current instruction).

In some embodiments, multiprocessors 130 may include a local memory 136 for use by the functional execution units of multiprocessors 130. In some embodiments, local memory 136 may include a private local memory space that may be (statically or dynamically) allocated to and accessed by individual threads in a group of threads being executed by multiprocessors 130, with the allocated portion serving as a private memory space of the individual thread. In some embodiments, local memory 136 may also include a shared memory space that may be (statically or dynamically) allocated to and accessed by some or all threads in a group of threads being executed by multiprocessors 130. In some embodiments, multiprocessors 130 may also be able to access a global memory space, e.g., on a device memory 121 of parallel processor 120, which may be provided to some or all threads in a group of threads being executed by multiprocessors 130.

In some embodiments, computing system 100 may include software compiler logic 150 that may be used to compile a computer application (e.g., computer application 140) from program code, which may be stored in memory 112. Software compiler logic 150, for example, may be used to compile program source code 151 into binary code 154 that may be executed by general purpose processor 110 and/or parallel processor 120. Program source code 151 may include a mix of code, some of which may be designed to execute on general purpose processor 110 ("host code") and some of which may be designed to execute on parallel processor 120 ("device code"). In some embodiments, software compiler logic 150 may operate to separate device code from host code and compile the code separately. Software compiler logic 150, for instance, may compile device source code, e.g., into one or more function kernels, and then modify the host code to include the necessary runtime functional calls to load and launch each compiled function kernel. Software compiler logic 150 may then compile the modified host code to obtain binary code 154, which may be executable by computing system 100 on general purpose processor 110 and parallel processor 120.

In some embodiments, software compiler logic 150 may compile program source code 151, or a portion thereof (e.g., device code in program source code 151), in multiple stages, generating one or more sets of intermediate code (e.g., intermediate assembly code 152 and low-level assembly code 153) before ultimately arriving at binary code 154. Program source code 151, for instance, may be written using a high-level programming language (e.g., C, C++, Java, Python, Fortran, DirectCompute, OpenACC, etc.). Software compiler logic 150 may compile program source code 151 written in a high-level programming language into intermediate assembly code 152 (e.g., PTX code, Khronos SPIR code, LLVM IR code, etc.), which may use a particular instruction set architecture (ISA). In some embodiments, intermediate assembly code 152 may use an instruction set suitable for general purpose parallel programming, which may be designed for efficient execution by parallel processors 120. In some embodiments, software compiler logic 150 may compile device code in program source code 151 into an intermediate assembly code 152 that is designed to be architecture independent, so the same code can be used for different parallel processor architectures. In some embodiments, a computer application (or portion thereof) may be directly written as intermediate assembly code 152. In some embodiments, software compiler logic 150 may operate to translate (e.g., further compile) intermediate assembly code into low-level assembly code 153 (e.g., Source and Assembly (SASS) code). Low-level assembly code 153 may use another ISA (e.g., distinct from that of intermediate assembly code 152), which may be a native architecture that uses target-architecture instructions for particular parallel processor architectures. In some embodiments, software compiler logic 150 may use low-level assembly code 153 to generate binary microcode for native execution on a parallel processor 120.

In some embodiments, software compiler logic 150 may operate to generate (e.g., optimized) program code (e.g., intermediate assembly code 152, low-level assembly code 153, or binary code 154), which for example, may improve execution efficiency and resource utilization. Software compiler logic 150, for example, may seek to optimize program code to expose sufficient parallelism, coalesce memory access, ensure coherent execution within a group of threads, etc., which may improve execution of the program code on parallel processor 120 (and multiprocessors 130).

In some embodiments, for example, software compiler logic 150 may operate to perform branch predication (or control flow flattening) to ensure convergent execution of multiple threads (e.g., all threads in a group of threads). In some embodiments, for example, software compiler logic 150 may analyze program code and determine instances where branch predication may be used to implement the code more efficiently. Software compiler logic 150, for instance, may determine when program loops (e.g., for, while, do-while loops) or logic blocks (e.g., if or switch blocks) create branches in the program code that may be cheaper to predicate and execute for all threads (e.g., cheaper than branching the code and serially executing each branch path) and may unroll or flatten these loops or logic blocks. That is, instructions whose execution depends on a conditional control construct (e.g., a conditional branch, conditional function call, or conditional return) are not skipped, but instead are associated with a per-thread condition code, or predicate, that is set to true or false based on the controlling condition. While these instructions may be scheduled for execution by all threads, only those instructions (or threads) with a true predicate value are actually executed. For instructions (or threads) having a false predicate value, addresses may not be evaluated, operands may not be read, and/or results may not be written. Predicating and executing the instruction for all threads may be cheaper.

In some embodiments, software compiler logic 150 may generate code that is optimized for execution by a particular parallel processor 120, e.g., taking into account the different functional execution units of the parallel processor 120 (and its multiprocessors 130) and the operations they support. For example, in a SIMT programming and execution model, instructions may be executed by multiple threads concurrently, with each thread reading potentially distinct input data in respective source operands and generating potentially distinct results to respective destination operands. While instructions, at a hardware level, may generally be executed using a parallel execution unit 131, it may not always be possible or advantageous to do so, and some instructions may need to be, or may preferably be, executed using a serial execution unit 132. Software compiler logic 150 may detect such instances (e.g., where execution of an instruction using a serial execution unit 132 is necessary and/or preferable) and may operate to adapt program code written for parallel execution to be executed on serial execution units 132. Software complier 150 may further operate to optimize the adapted code for more efficient execution (e.g., by eliminating unnecessary operations, performing branch predication, etc.).

In some instances, multiple threads may concurrently execute the same deterministic instruction on uniform sets of input operands to generate the same result. In such cases, the redundant execution of the instruction by each thread (e.g., using a parallel execution unit 131), unnecessarily increases power consumption and resource utilization. Therefore, in some embodiments, software compiler logic 150 may be able to analyze program code to determine whether an instruction that is to be executed by multiple threads exhibits execution uniformity (e.g., where the threads are to execute the instruction concurrently) and operand uniformity (e.g., where the source operands of the instruction for the threads have the same value). In some embodiments, for example, software compiler logic 150 may perform iterative flow analysis to determine whether an instruction exhibits execution and/or operand uniformity. Based on this analysis, software compiler logic 150 may determine whether to execute the instruction or serial execution units 132 (e.g., for improved execution efficiency).

In some cases, software compiler logic 150 may be able to determine with certainty that a deterministic instruction to be executed by a group of active threads exhibits complete execution uniformity (e.g., for all threads) and operand uniformity (e.g., for all source operands). Software compiler logic 150, for example, may be able to determine that the instruction is to be executed by a single thread, based on which software compiler logic 150 may conclude that the instruction exhibits complete operand uniformity (e.g., the single thread is uniform with itself). In such cases, instead of generating an instruction to be executed by a parallel execution unit 131 ("parallel instruction"), software compiler logic 150 may generate an instruction (or several instructions) that affects execution of the instruction by a serial execution unit 132 ("uniform instruction"). Software compiler logic 150, for example, may generate instructions to copy any source operand values stored in private registers 133 into shared registers 134 (e.g., to obtain shared source operands accessible by a serial execution unit 132) and a uniform instruction to be executed using the shared source operands. In some embodiments, software compiler logic 150 may generate the parallel instruction in the first instance, and then replace the parallel instruction with the uniform instruction (or uniform instructions).

As an illustrative example, program source code 151 may include an addition operation, in which three integer values are to be added together, to be performed for each thread in a group of threads. Software compiler logic 150 may typically generate the following assembly instruction (e.g., in low-level assembly code 153), which may operate to perform the addition operation separately for each thread using a parallel execution unit 131:

iadd r9, r2, r5;

where iadd may be a parallel instruction that adds the values of source operands r2 and r5, which may be private registers (e.g., in the register space of each thread), and places the result in destination operand r 9, which may be a private register (e.g., in the register space of each thread).

Where software compiler logic 150 is able to determine that the source operand values (e.g., values in private registers r2 and r5) will be the same for each thread, it may generate the following assembly instructions instead, to affect execution of the addition operation once on behalf of all threads using a serial execution unit 132:

```
mov ur2, r2;
mov ur5, r5;
uiadd ur9, ur2, ur5;
``` where the mov instructions may operate to copy source operand values from private registers r2 and r5 (e.g., from a register space of a particular thread) to shared registers ur2 and ur5 (e.g., to the shared register space accessible by all threads), and uiadd may be a uniform instruction that performs the addition operation once using the shared source operands on serial execution unit 132. The result of the add operation may, optionally, be copied back to a private register for each thread, e.g., as follows:

mov r9, ur9;

In other cases, software compiler logic 150 may be able to determine that there is a high likelihood (but not certainty) that a deterministic instruction to be executed by a group of active threads exhibits execution uniformity and operand uniformity. In such cases, software compiler logic 150 may generate a peeling loop that may operate to partition and unwind execution of the group of threads into one or more sets of threads having shared source operand values that are executed once (e.g., for all threads in a particular set of threads) in serial fashion (e.g., for each of the one or more set of threads) using serial execution unit 132.

In some embodiments, software compiler logic 150 may make use of a collect instruction that may operate to collect threads in a group of threads having a common source operand value and, as necessary, copy the common source operand value from a private register 133 to a shared register 134. In some embodiments, the collect instruction may be executed by parallel execution unit 131 as a collective operation. That is, parallel execution unit 131 in executing the collect instruction may perform a collective operation in which the group of threads executing the instruction work together to choose a common source operand value and collect those threads having that common source operand value.

In some embodiments, the collect instruction may take the following form:

@pg collect pd, urd, rs, ps

The collect instruction may have two source operands rs, ps, two destination operands urd, pd, and an optional predicate guard @pg. Source operand ps may be a predicate mask identifying a group of active threads for which an instruction is pending execution (e.g., for which the predicate mask ps is true) from which a set of threads is to be collected. The instruction may operate to identify a set of threads where the value of private register rs is the same value and copy the value to shared register urd. A destination predicate pd may be set to true for the identified threads, with any other active threads being set to false. In some embodiments, the collect instruction may be fully predicated using predicate guard @pg.

In some embodiments, for example, software compiler logic 150 may generate a "collect" peeling loop, where each iteration of the peeling loop may include collect instructions that are recursively called to collect a set of threads having uniform source operand values (e.g., where each source operand of the instruction has the same value across all threads) and place the source operand values in shared registers 134 (as necessary). A uniform instruction may then be executed by serial execution unit 132 using the uniform source operand values, the result of which may, optionally, be copied back to a private register for threads in the set of threads for which the instruction was executed. The predicate mask identifying active threads may be updated (e.g., to exclude those threads for which the instruction was just executed) and the peeling loop may proceed to the next iteration, ultimately terminating when no threads remain pending execution.

As an illustrative example, software compiler logic 150 may generate the following peeling loop for the addition operation described above:

```
set p1, pTrue                // 1
Ltop:
    collect p0, ur5, r5, p1  // 2
    collect p0, ur2, r2, p0  // 3
    uiadd ur9, ur2, ur5      // 4
    @p0 mov r9, ur9          // 5
    @p1 mov p1, ~p0          // 6
    @p1 branch.u.any Ltop    // 7
```

The predicate p1 may be used to store the active threads for which the instruction is pending execution. As illustrated above, predicate p1 is initialized to true (by pTrue), e.g., for all threads in a group of threads (e.g., in a warp), but in other cases predicate p1 may inherit the predication of the instruction being executed, e.g., where the addition operation is to be performed for a subset of a group of threads (e.g., a half warp, a quarter warp, etc.).

The loop may begin with a first collect instruction that may operate to collect a set of threads having the same value in a first source operand, e.g., private register r5, placing the value into shared register ur5 and setting predicate pG to true for those threads that were just collected (e.g., with all other active threads set to false). In some embodiments, the selection of an anchor source operand value (e.g., based on which the collection is performed) may be identified at random from amongst the threads being collected, while in other embodiments, the source operand value of a first thread (e.g., having a lowest thread ID) may be used as the anchor value for the collect operation.

The collect operation may be repeated, recursively, for the remaining source operands. A second collect operation, for instance, may operate to collect a subset of threads from those previously collected (e.g., from the threads in predicate p0) having the same value in a second source operand, e.g., source operand r2, placing the value into shared register ur2 and setting predicate p0 to true for those threads that were just collected.

At this point, a set of threads having uniform source operand values may have been collected (identified by predicate p0), with the common source operand values being stored in shared registers 134. A uniform instruction uiadd may then be executed by serial execution unit 132 using the uniform source operand values in shared registers ur2 and ur5 and placing the result in shared register ur9. Because the instruction is to be executed by a serial execution unit 132 for at least one thread, no predicate guard is needed. A mov instruction may optionally be performed to move the result to a private register for each thread in the set of threads for which the instruction was executed (e.g., by using predicate p0 as a predicate guard for the instruction).

The set of remaining active threads pending execution may be updated (e.g., to exclude the threads from a next iteration of the loop) using:

@p1 mov p1, ~p0

The peeling loop may then proceed to the next iteration with those threads for which the instruction is still pending execution (e.g., returning to Ltop), ultimately terminating when no threads remaining pending execution (e.g., where branch.u.any evaluates to false or null).

In some embodiments, software compiler logic 150 may further optimize (or attempt to optimize) the peeling loop, e.g., to reduce the number of levels in the peeling loop or flatten the peeling loop entirely. For example, as discussed above, software compiler logic 150 may be able to analyze program code to determine whether an instruction exhibits execution and/or operand uniformity (e.g., by performing iterative flow analysis). Where software compiler logic 150 is able to determine that the instructions exhibit complete operand uniformity, the peeling loop may be eliminated entirely, e.g., generating uniform instructions as discussed herein. Software compiler logic 150, for example, may be able to determine that the instruction is to be executed by a single thread, based on which software compiler logic 150 may conclude that the instruction exhibits complete operand uniformity (e.g., the single thread is uniform with itself).

In some cases, software compiler logic 150 may be able to determine that an instruction exhibits partial operand uniformity, e.g., where certain operands share the same value across all threads in a group of active threads. In such cases, software compiler logic 150 may copy the operand values to shared registers (as necessary) outside the peeling loop, and partition and unwind the execution of the group of threads based on the remaining source operands. As an illustrative example, with reference to the addition operation previously discussed, software compiler logic 150 may determine that the values of source operand r2 is the same for all threads in an active thread group, in which case software compiler logic 150 may generate the following instructions (with a simplified peeling loop):

```
set p1, pTrue              // 1
mov ur2, r2                // 2
Ltop:
    collect p0, ur5, r5, p1    // 3
    uiadd ur9, ur2, ur5        // 4
    @p0 mov r9, ur9            // 5
    @p1 mov p1, ~p0            // 6
    @p1 branch.u.any Ltop      // 7
```

In some cases, software compiler logic 150 may be able to determine that one or more of the source operands is generated by a uniform instruction such that the value need not be copied to a shared register 134 (e.g., because the source operand value is already stored in a shared register 134). In such cases, software compiler logic 150 may be able to eliminate the mov instruction for the source operand in the above peeling loop (and the collect instruction for the source operand in the peeling loop). Software compiler logic 150, likewise, may be able to determine that the result of the instruction is only used by other uniform instructions, such that the result need not be copied to a private register 133. In such cases, the mov instruction may be eliminated from the peeling loop (e.g., the @p0 mov r9, ur9 instruction may be removed from the described peeling loops).

In some cases, software compiler logic 150 may apply branch predication to optimize peeling loops. Software compiler logic 150, for example, may be able to determine that an instruction is to be executed for multiple branch paths and that the instruction exhibits complete operand uniformity or substantial operand uniformity in each branch (e.g., such that optimization would be beneficial). Rather than generate a collect peeling loop for each branch path to be serially executed, software compiler logic 150 may generate a combined peeling loop in which instructions for each branch path are included within the same peeling loop but are predicated with different conditions (e.g., based on the conditional control construct that resulted in the different branch paths). In some cases, software compiler logic 150 may further optimize the combined peeling loop, e.g., to reduce the number of levels in the peeling loop or flatten the peeling loop entirely, as described herein.

In some embodiments, software compiler logic 150 may operate to promote values from private registers 133 to shared registers 134, e.g., upon a determination that they are uniform across all threads in a group of active threads, which may facilitate the peeling loop simplifications just described. For example, in some embodiments, analysis of program code by software compiler logic 150 may reveal cohesive regions of the program and/or convergent write operations in the program code, where it may be expected that instruction operands may have uniform values across a group of active threads. Software compiler logic 150 may employ different heuristics to determine when to promote operands within these portions of the program code. For example, in some embodiments, software compiler logic 150 may consider the number of conversions emitted between private and shared registers, which may provide an indication of whether an instruction can accept a uniform register as an operand or whether a uniform version of an instruction (e.g., a uniform instruction) exists. In some embodiments, software compiler logic 150 may consider register pressure, e.g., on both private and shared register spaces, and may look to balance pressure between the private and shared spaces so as to avoid register spills. In some embodiments, software compiler logic 150 may prioritize reducing pressure in a private register space, as register spills experienced therein may be more expensive. For example, in some embodiments, shared register spills may be placed in private registers, whereas private register spills may go to memory (e.g., local memory 136).

In some embodiments, software compiler logic 150 may operate to recast instructions to align with operand types permitted by an underlying execution unit (e.g., as supported by parallel execution units 131 or serial execution units 132). For example, in some embodiments, parallel execution units 131 may support the use of shared register operands for certain operands of an instruction and software compiler logic 150 may operate to reorder the operands of an operation to align any operand type mismatches. By way of example, a parallel execution unit 131 may support an iadd instruction in which shared registers are permitted for the last source operand. Software compiler logic 150 may encounter an addition operation where a shared register is used for the first source operand (but not the second), in which case software compiler logic 150 may recast the operation such that the shared register is provided as the last operand, permitting execution of the iadd instruction on parallel execution unit 131. Likewise, if a serial execution unit 132 does not support execution of particular operation, software compiler logic 150 may convert any shared register operands (e.g., operands that are to be stored in shared registers 134) to private register operands (e.g., operands that are to be stored in private registers 133), such that the operation may be executed using parallel execution unit 131.

In some embodiments, parallel processor 120 (and its multiprocessors 130) may not support execution of particular instructions using a parallel execution unit 131. For instance, because compute logic is replicated for each thread lane in embodiments, parallel execution units 131 may not support instructions that require a significant amount of silicon real estate to implement (e.g., TMA operations). Furthermore, some instructions may be too expensive to execute using a parallel execution unit 132. For example, certain operations may take a substantial amount of time to execute (e.g., a TMA operation may take several hundreds or thousands of clock cycles to execute) but may only be executed by a few threads at a time, reducing the overall utilization rate of the parallel execution unit 131. Other operations may not be effectively parallelized and, thus, may not be efficiently executed by a parallel execution unit 131. Software compiler logic 150 may analyze the program code to determine such instances and may adapt the program code for execution on a serial execution unit 132.

For example, as discussed above, software compiler logic 150 may generate a peeling loop (e.g., a "collect" peeling loop) that may operate to partition and unwind execution of the group of threads into one or more sets of threads having shared source operands values that are executed once (e.g., for all threads in a particular set of threads) in serial fashion (e.g., for each of the one or more set of threads) using serial execution unit 132. However, such peeling loops may not be used for certain types of instructions, for example, those that generate results dependent on the number and/or identity of threads executing the instruction (e.g., in-memory reduction operations or counters that count the number of threads executing an instruction). In such cases, software compiler logic 150 may generate a peeling loop that may operate to unwind and execute the instruction one thread at a time on a serial execution unit 132.

In some embodiments, software compiler logic 150 may make use of a select instruction to select a single thread from a group of active threads for execution. In some embodiments, for example, the select instruction may take the following form:

@pg select pd, ps

In some embodiments, the select instruction may operate to choose a single thread at random from a group of active threads pending execution of an instruction, while in other embodiments, a first thread (e.g., having a lowest thread ID) in the group of active threads may be chosen. Source operand p s may be a predicate mask identifying a group of active threads from which a selection is made. Destination predicate pd may be set to true for the chosen thread, with any other active threads being set to false. In some embodiments, the select instruction may be fully predicated using predicate guard @pg.

In some embodiments, for example, software compiler logic 150 may generate a "select" peeling loop, where each iteration of the peeling loop may include a select instruction that selects a single thread from a group of active threads and instructions to copy the source operand values of the selected instruction to shared registers 134 (as necessary). A uniform instruction may then be executed by serial execution unit 132 using the shared source operands, the result of which may, optionally, be copied back to a private register for threads in the set of threads for which the instruction was executed. The source predicate mask identifying active threads may be updated (e.g., to exclude the thread for which the instruction was just executed) and the peeling loop may proceed to the next iteration, ultimately terminating when no threads remain pending execution.

As an illustrative example, software compiler logic 150 may generate the following peeling loop for a reduction operation red having two source operands r0 and r1, which may be private registers (e.g., in the register space of each thread), and a destination operand r2, which may be a private register (e.g., in the register space of each thread):

```
    set p1, pTrue              // 1
Ltop:
    select p0, p1              // 2
    @p0 mov ur0, r0            // 3
    @p0 mov ur1, r1            // 4
    ured ur2, [ur0], ur1       // 5
    @p0 mov r2, ur2            // 6
    @p1 mov p1, ~p0            // 7
    @p1 branch.u.any Ltop      // 8
```

The predicate p1 may be used to store the active threads for which the instruction is pending execution. As illustrated herein, predicate p1 is initialized to true (by pTrue), e.g., for all threads in a group of threads (e.g., in a warp), but in other cases predicate p1 may inherit the predication of the instruction being executed, e.g., where the operation is to be performed for a subset of a group of threads (e.g., a half warp, a quarter warp, etc.).

The loop may begin with a select instruction that may operate to select a thread from the group of threads, setting the predicate p0 to true for the selected thread (e.g., with all other active threads set to false). The values of source operand r0 and r1 for the selected thread may then be copied to respective registers in shared register 134. A uniform instruction ured may then be executed by serial execution unit 132 using the shared source operand values ur0 and ur1 in shared registers 134, placing the result in shared register ur0. Because the instruction is to be executed by a serial execution unit 132 for at least one thread, no predicate guard is needed. A mov instruction may optionally be performed to move the result back to a private register of the selected thread for which the instruction was executed (e.g., by using predicate p0 as a predicate guard for the instruction).

The set of remaining active threads pending execution may be updated (e.g., to exclude the thread from a next iteration of the loop) using:

@p1 mov p1, ~p0

The peeling loop may then proceed to the next iteration with those threads for which the instruction is still pending execution (e.g., returning to Ltop), ultimately terminating when no threads remaining pending execution.

In some embodiments, software compiler logic 150 may further optimize the peeling loop, e.g., by utilizing single thread execution analysis to simplify the loop. Software compiler logic 150, for example, may be able to analyze program code to determine whether an instruction is executed for at least one thread, at most one thread, or exactly one thread. Where software compiler logic 150 is able to determine that an instruction is to be executed by at most one thread, it may not be necessary to perform the select instruction or use a peeling loop. Where software compiler logic 150 is able to determine that an instruction is to be executed by at least one thread execution of the uniform instruction need not be predicate (e.g., execution of ured need not be predicated). Where both conditions are true, e.g., where software compiler logic 150 is able to determine that exactly one thread executes the instruction, neither the peeling loop nor predication is necessary. For example, with reference to the previous red operation, where software compiler logic 150 is able to determine that the operation is to be performed by exactly one thread, software compiler logic 150 may generate the following instructions:

```
mov ur0, r0
mov ur1, r1
ured ur2, [ur0], ur1
mov r2, ur2
```

Furthermore, as discussed above with respect to the "collect" peeling loop, software compiler logic 150 may be able to determine that one or more of the source operands is generated by a uniform instruction, e.g., the source operand is a shared register 134, such that the value need not be copied. Software compiler logic 150, likewise, may be able to determine that the result of the operation is only used by another uniform instruction, such that the result need not be copied back to a private register 133 (e.g., the @p0 mov r2, ur2 instruction may be removed). And in some embodiments, software compiler logic 150 may operate to promote values from private registers 133 to shared registers 134, e.g., upon a determination that they are uniform across all threads in a group of active threads, which may facilitate these simplifications.

In some embodiments, the single thread execution analysis performed software compiler logic 150 may examine instruction predicates (e.g., instruction predicate guards) to determine whether an instruction is to be executed by at least, at most, or exactly one thread. Software compiler logic 150, for example, may determine that the select instruction results in selection of exactly one thread, e.g., resulting in a single-thread predicate. As another example, software compiler logic 150 may identify instances where the program code identifies a particular thread within a group of active threads (e.g., a specific lane_id) and uses this identification to define a predicate that is only true for that thread (e.g., comparing the lane_id to an invariant operand mask), e.g., resulting in a single-thread predicate. In some embodiments, software compiler logic 150 may be able to identify single thread blocks (e.g., where a thread block only includes a single block).

In some embodiments, software compiler logic 150 may also track the propagation of single-thread predicates and may be able to draw conclusions about predicates that are derived from a single-thread predicate. Software compiler logic 150, for example, may determine that instructions predicated by a single-thread predicate, or branch paths executed based on a single-thread predicate are also executed for a single thread. Software compiler logic 150 may also determine that predicates resulting from a logical operation with a single-thread predicate (e.g., AND, OR, SET, NOT) exhibit single thread execution properties. Software compiler logic 150, for instance, may determine that a predicate resulting from an AND operation with a single-thread predicate indicates that at most one thread is executed or that a predicate resulting from an OR operation with a single-thread predicate indicates that at least one thread is executed.

In some embodiments, computing system 100 may execute binary code 154 generated by software compiler logic 150 using general purpose processor 110 and parallel processors 120. As discussed above, in compiling binary code 154, software compiler logic 150 may determine whether to perform particular instructions using parallel execution units 131 or serial execution units 132. Where a determination is made to perform an instruction on serial execution unit 132, software compiler logic 150 may have included a peeling loop in binary code 154. Binary code 154, for instance, may include one or more collect peeling loops (or optimized versions thereof) that, when executed, may operate to partition a group of threads into sub-groups and perform the instruction once for each sub-group using serial execution unit 132. Binary code 154 may also include one or more select peeling loops (or optimized versions thereof) that, when executed, may perform the instruction for a group of threads one at a time on serial execution unit 132

Figure 2:
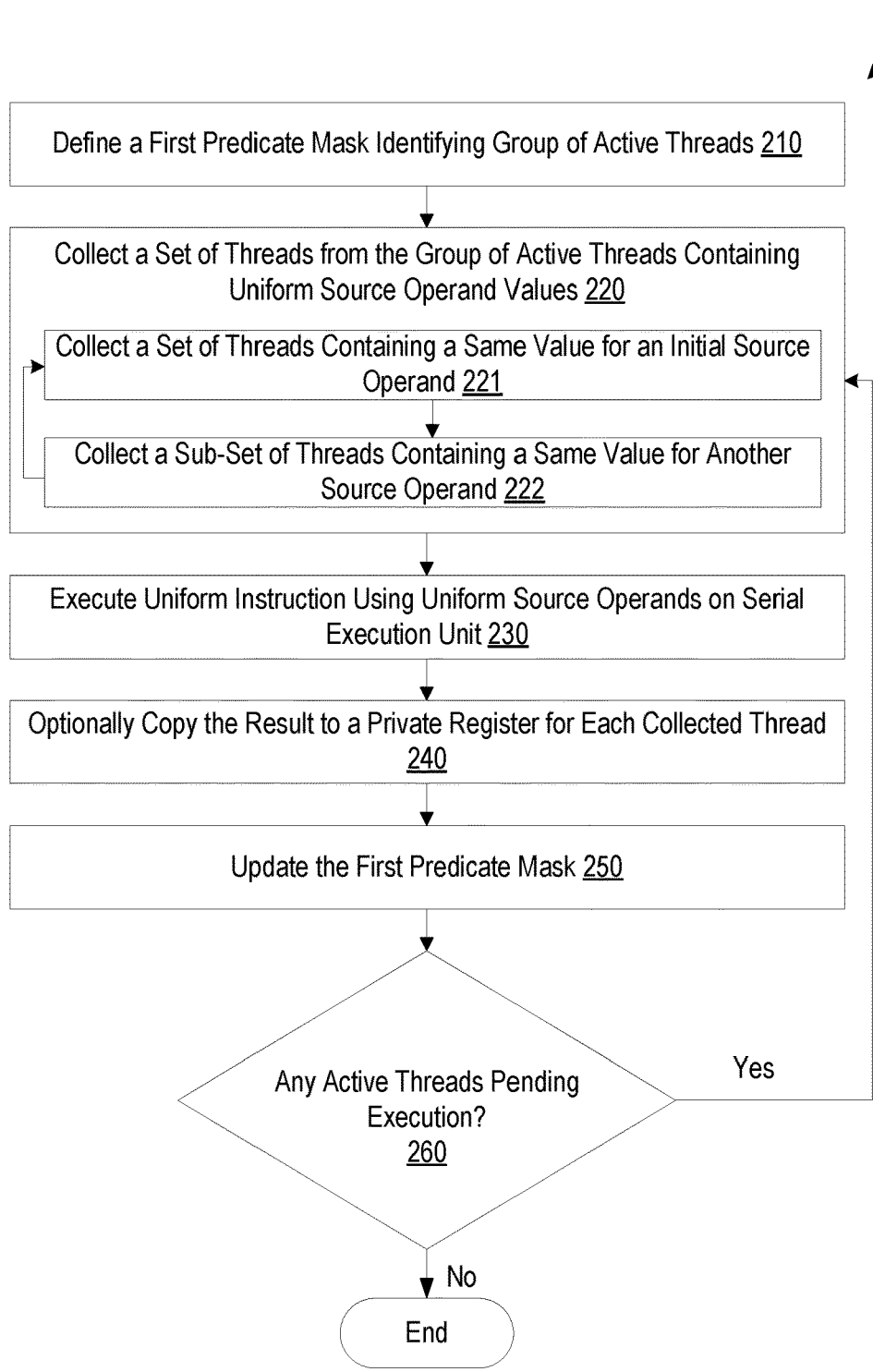
FIG. 2 illustrates a flow diagram of an example method for executing an instruction on a serial execution unit using a collect peeling loop, according to at least one embodiment.
Figure 3:
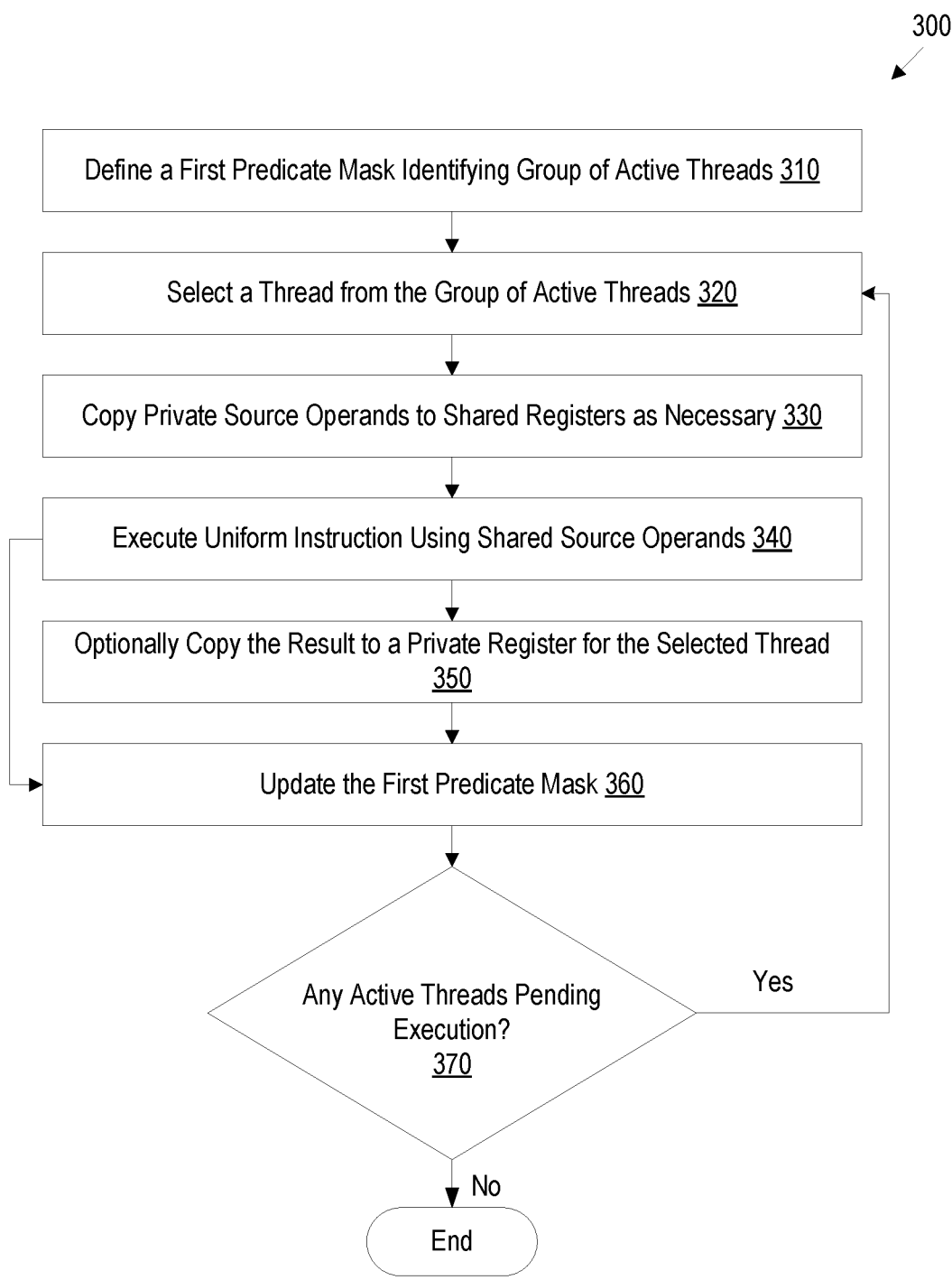
FIG. 3 illustrates a flow diagram of an example method for executing an instruction on a serial execution unit using a select peeling loop, according to at least one embodiment.

FIGS. 2 and 3 illustrate example methods in accordance with embodiments of the present disclosure. For the sake of simplicity and clarity, these methods are depicted and described as a series of operations. However, in accordance with the present disclosure, such operations may be performed in other orders and/or concurrently, and with other operations not presented or described herein. Furthermore, not all illustrated operations may be required in implementing methods in accordance with the present disclosure. Those of skill in the art will also understand and appreciate that the methods could be represented as a series of interrelated states or events via a state diagram. Additionally, it will be appreciated that the disclosed methods are capable of being stored on an article of manufacture. The term "article of manufacture," as used herein, is intended to encompass a computer-readable device or storage media provided with a computer program and/or executable instructions that, when executed, affect one or more operations.

FIG. 2 illustrates a flow diagram of an example method 200 for executing an instruction on a serial execution unit using a collect peeling loop, according to at least one embodiment. In a SIMT programming and execution model, instructions may be executed by multiple threads concurrently, with each thread reading potentially distinct input data in respective source operands and generating potentially distinct results to respective destination operands. However, it is often the case that multiple threads concurrently execute the same deterministic instruction on uniform sets of input operands to generate the same result. In such cases, the redundant execution of the instruction by each thread using a parallel execution unit (e.g., parallel execution units 131) unnecessarily increases power consumption and resource utilization. A peeling loop may be used to partition and unwind execution of the group of threads into one or more sets of threads having shared source operands values that are executed once (e.g., for all threads in a particular set of threads) in serial fashion (e.g., for each of the one or more set of threads).

At operation 210, processing logic may define a first predicate mask that may identify a group of active threads for which an instruction is pending execution. In some cases, the predicate mask may be initialized to true for all threads in a group of threads. In others, the predicate mask may be initialized with an inherited predicate mask of the instruction being executed.

At operation 220, processing logic may begin the peeling loop by collecting a set of threads having uniform source operand values (e.g., where each source operand of the instruction has the same value across all threads) and (as necessary) place the source operand values in shared registers (e.g., shared registers 134) accessible by a serial execution unit (e.g., serial execution unit 132).

At block 221, processing logic may collect a set of threads having the same value in an initial source operand, placing the operand value into a shared register (e.g., into shared registers 134) and setting a loop predicate mask to true for those threads that were collected (e.g., with all other active threads set to false). In some embodiments, the selection of an anchor source operand value (e.g., based on which the collection is performed) may be identified at random from amongst the threads being collected, while in other embodiments, the source operand value of a first thread (e.g., having a lowest thread ID) may be used as the anchor value for the collect operation.

At block 222, processing logic may repeat the collect operation recursively for the remaining source operands, e.g., by collecting a subset of threads from those previously collected (e.g., from the threads in the loop predicate mask) having the same value in another source operand, placing the operand value into a shared register (e.g., into shared registers 134) and updating the loop predicate mask to be true for the subset of threads just collected. As before, in some embodiments, the selection of an anchor source operand value may be identified at random, while in others, the source operand value of a first thread may be used as the anchor value for the collect operation.

At operation 230, once the collect operation has been performed for (e.g., all) source operands and a set of threads having uniform source operand values has been collected (e.g., identified by the loop predicate mask), the processing logic may execute a uniform instruction using the uniform source operand values on a serial execution unit (e.g., serial execution unit 132), with a result being placed into a shared register (e.g., into shared registers 134). Because the instruction is to be executed by a serial execution unit 132 for at least one thread, no predicate guard is needed.

At operation 240, the processing logic may optionally copy the result back to a private register (e.g., private registers 133) for each collected thread in the set of threads for which the instruction was executed, for example, by using the loop predicate mask as a predicate guard for the copy operation.

At operation 250, processing logic may update the first predicate mask to identify those threads for which execution of the instruction remains pending (e.g., to exclude the threads collected in the current iteration from being considered in a next iteration of the loop).

At operation 260, processing logic may determine whether any threads remain pending execution. If so, processing logic may return to operation 220, otherwise the loop may terminate and processing logic may proceed with a next instruction.

FIG. 3 illustrates a flow diagram of an example method 300 for executing an instruction on a serial execution unit using a select peeling loop, according to at least one embodiment. In some cases, a parallel processor (e.g., parallel processor 120) may not support execution of an instruction using a parallel execution unit (e.g., parallel execution units 131 of multiprocessors 130) or an instruction may be too expensive to execute using a parallel execution unit. Some instructions may also generate results that depend on the number and/or identity of threads executing the instruction for which a collect peeling loop may not be employed. In such cases, a select peeling loop may be used to unwind and execute the instruction one thread at a time on a serial execution unit (e.g., serial execution unit 132).

At operation 310, processing logic may define a first predicate mask that may identify a group of active threads for which an instruction is pending execution. In some cases, the predicate mask may be initialized to true for all threads in the group of threads. In others, the predicate mask may be initialized with an inherited predicate mask of the instruction being executed.

At operation 320, processing logic may begin the peeling loop by selecting a thread from the group of active threads and setting a loop predicate mask to true for that thread (e.g., with all other active threads set to false). In some embodiments, the selection of the thread may be performed at random, while in others, the first thread in the group of threads (e.g., having a lowest thread ID) may be selected.

At operation 330, processing logic may copy (as necessary) the values of private source operands (e.g., in private registers 133) to shared registers (e.g., to shared registers 134) to obtain shared source operands.

At operation 340, the processing logic may execute a uniform instruction using the shared source operands on a serial execution unit (e.g., serial execution unit 132), with a result being placed into a shared register (e.g., into shared registers 134). Because the instruction is to be executed by a serial execution unit 132 for at least one thread, no predicate guard is needed.

At operation 350, the processing logic may optionally copy the result back to a private register (e.g., private registers 133) for the selected thread for which the instruction was executed (e.g., using the loop predicate mask as a predicate guard for the copy operation).

At operation 360, processing logic may update the first predicate mask to identify those threads for which execution of the instruction remains pending (e.g., to exclude the thread selected in the current iteration from being considered in a next iteration of the loop).

At operation 370, processing logic may determine whether any threads remain pending execution. If so, processing logic may return to operation 320, otherwise the loop may terminate and processing logic may proceed with a next instruction.

Figure 4:
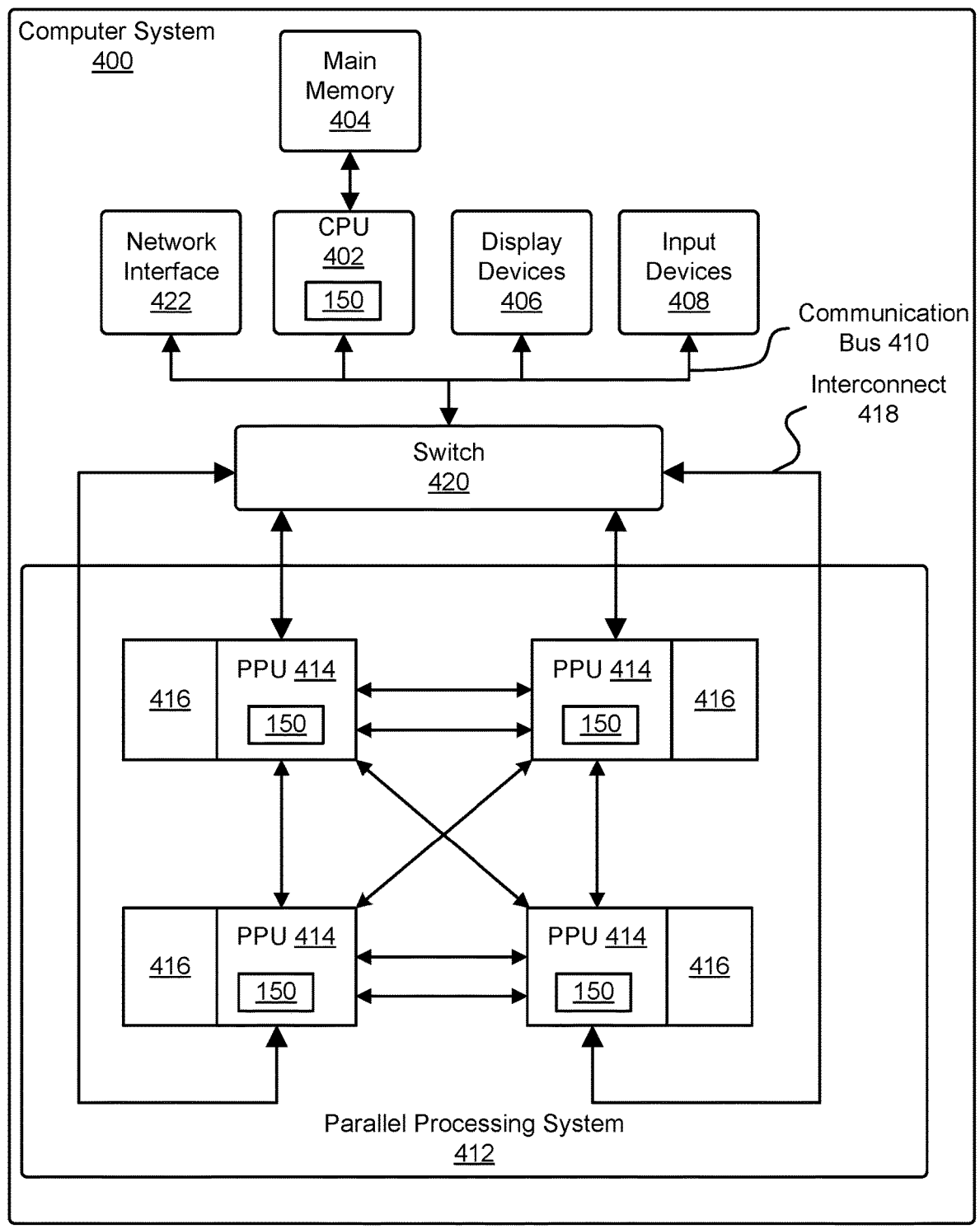
FIG. 4 illustrates a computer system, according to at least one embodiment.

FIG. 4 illustrates a computer system 400, according to at least one embodiment. In at least one embodiment, computer system 400 is configured to implement various processes and methods described throughout this disclosure.

In at least one embodiment, computer system 400 comprises at least one central processing unit ("CPU") 402 that is connected to a communication bus 410 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 400 includes a main memory 404, which may take form of random-access memory ("RAM"). Control logic (e.g., implemented as hardware, software, or a combination thereof) and data are stored in main memory 404. In at least one embodiment, a network interface subsystem ("network interface") 422 provides an interface to other computing devices and networks for receiving data from and transmitting data to other systems with computer system 400.

In at least one embodiment, computer system 400 includes one or more input devices 408, a parallel processing system 412, and one or more display devices 406 that can be implemented using a conventional cathode ray tube ("CRT"), a liquid crystal display ("LCD"), a light emitting diode ("LED") display, a plasma display, or other suitable display technologies. In at least one embodiment, user input is received from input devices 408 such as keyboard, mouse, touchpad, microphone, etc. In at least one embodiment, each module described herein can be situated on a single semiconductor platform to form a processing system.

Software compiler logic 150 may be used to perform software compilation operations associated with one or more embodiments, including generating and optimizing peeling loops to execute instructions on serial execution units. Details regarding software compiler logic 150 are provided herein in conjunction with FIG. 1. In at least one embodiment, software compiler logic 150 and the program code it may generate may be used in the system of FIG. 4 for performing software compilation operations, including generating and optimizing peeling loops to execute instructions on serial execution units, and executing instructions on serial execution units.

In at least one embodiment, computer programs in form of machine-readable executable code or computer control logic algorithms are stored in main memory 404 and/or secondary storage. Computer programs, if executed by one or more processors, enable system 400 to perform various functions in accordance with at least one embodiment. In at least one embodiment, memory 404, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc.

In at least one embodiment, architecture and/or functionality of various previous figures are implemented in the context of CPU 402, parallel processing system 412, an integrated circuit capable of at least a portion of capabilities of both CPU 402 and parallel processing system 412, a chipset (e.g., a group of integrated circuits designed to work and sold as a unit for performing related functions, etc.), and/or any suitable combination of integrated circuit(s). In at least one embodiment, architecture and/or functionality of various previous figures are implemented in the context of a general computer system, a circuit board system, a game console system dedicated for entertainment purposes, an application-specific system, and more. In at least one embodiment, computer system 400 may take the form of a desktop computer, a laptop computer, a tablet computer, a server, a supercomputer, a smart-phone (e.g., a wireless, hand-held device), a personal digital assistant ("PDA"), a digital camera, a vehicle, a head mounted display, a hand-held electronic device, a mobile phone device, a television, a workstation, a game console, an embedded system, and/or any other type of logic device.

In at least one embodiment, parallel processing system 412 includes a plurality of parallel processing units ("PPUs") 414 and associated memories 416. In at least one embodiment, PPUs 414 are connected to a host processor or other peripheral devices via an interconnect 418 and a switch 420 or multiplexer. In at least one embodiment, parallel processing system 412 distributes computational tasks across PPUs 414 which can be parallelizable for example, as part of distribution of computational tasks across multiple graphics processing unit ("GPU") thread blocks. In at least one embodiment, memory is shared and accessible (e.g., for read and/or write access) across some or all of PPUs 414, although such shared memory may incur performance penalties relative to use of local memory and registers resident to a PPU 414. In at least one embodiment, operation of PPUs 414 is synchronized through use of a command such as _syncthreads( ), wherein all threads in a block (e.g., executed across multiple PPUs 414) to reach a certain point of execution of code before proceeding.

Figure 5:
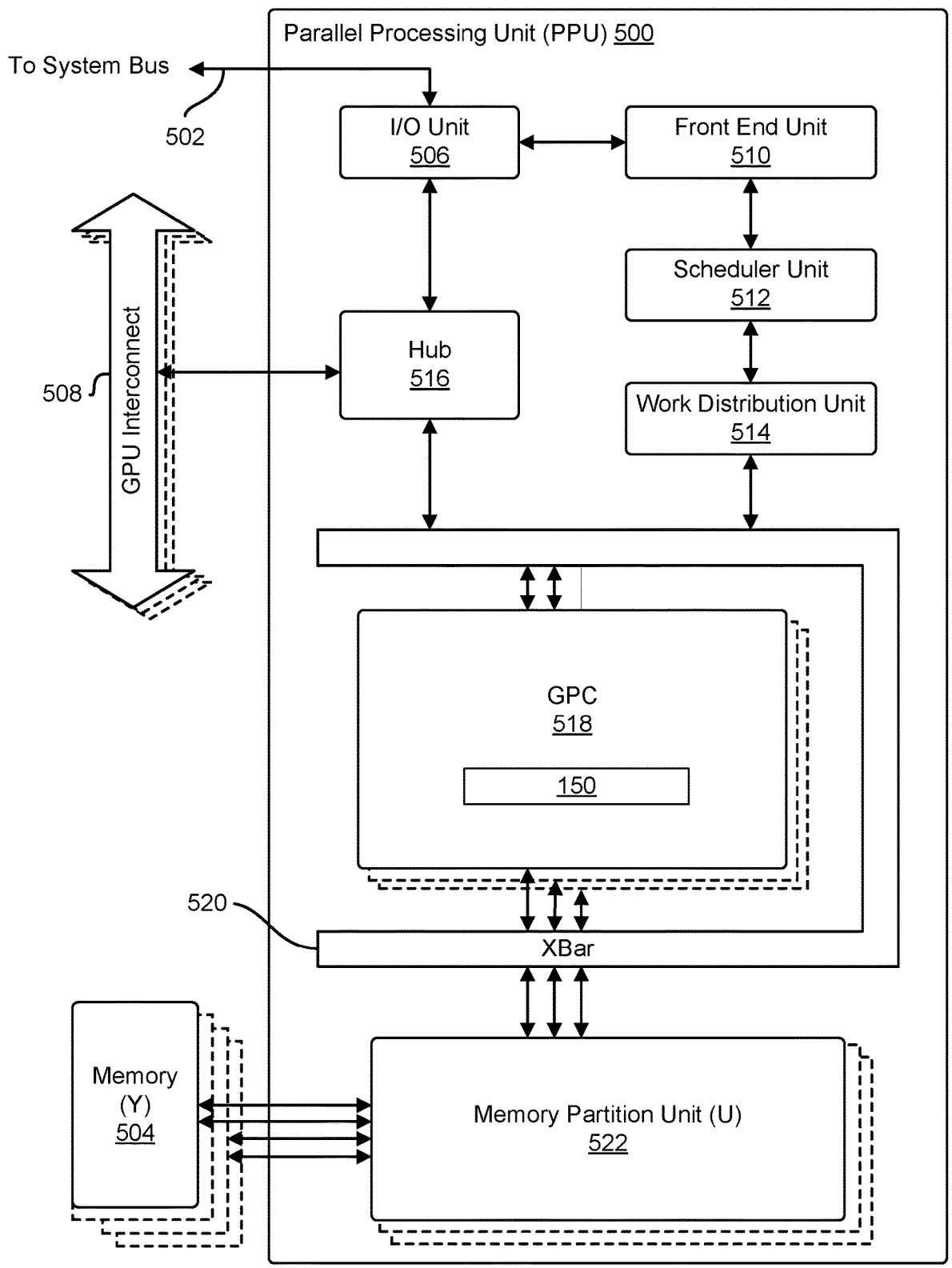
FIG. 5 illustrates a parallel processing unit ("PPU"), according to at least one embodiment.

FIG. 5 illustrates a parallel processing unit ("PPU") 500, according to at least one embodiment. In at least one embodiment, PPU 500 is configured with machine-readable code that, if executed by PPU 500, causes PPU 500 to perform some or all of processes and techniques described throughout this disclosure. In at least one embodiment, PPU 500 is a multi-threaded processor that is implemented on one or more integrated circuit devices and that utilizes multi-threading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 500. In at least one embodiment, PPU 500 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 500 is utilized to perform computations such as linear algebra operations and machine-learning operations. FIG. 5 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 500 are configured to accelerate High Performance Computing ("HPC"), data center, and machine learning applications. In at least one embodiment, PPU 500 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 500 includes an Input/Output ("I/O") unit 506, a front-end unit 510, a scheduler unit 512, a work distribution unit 514, a hub 516, a crossbar ("XBar") 520, one or more general processing clusters ("GPCs") 518, and one or more partition units ("memory partition units") 522. In at least one embodiment, PPU 500 is connected to a host processor or other PPUs 500 via one or more high-speed GPU interconnects ("GPU interconnects") 508. In at least one embodiment, PPU 500 is connected to a host processor or other peripheral devices via a system bus 502. In at least one embodiment, PPU 500 is connected to a local memory comprising one or more memory devices ("memory") 504. In at least one embodiment, memory devices 504 include one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 508 may refer to a wire-based multi-lane communications link that is used by systems to scale and include one or more PPUs 500 combined with one or more central processing units ("CPUs"), supports cache coherence between PPUs 500 and CPUs, and CPU mastering. In at least one embodiment, data and/or commands are transmitted by high-speed GPU interconnect 508 through hub 516 to/from other units of PPU 500 such as one or more copy engines, video encoders, video decoders, power management units, and other components which may not be explicitly illustrated in FIG. 5.

In at least one embodiment, I/O unit 506 is configured to transmit and receive communications (e.g., commands, data) from a host processor (not illustrated in FIG. 5) over system bus 502. In at least one embodiment, I/O unit 506 communicates with host processor directly via system bus 502 or through one or more intermediate devices such as a memory bridge. In at least one embodiment, I/O unit 506 may communicate with one or more other processors, such as one or more of PPUs 500 via system bus 502. In at least one embodiment, I/O unit 506 implements a Peripheral Component Interconnect Express ("PCIe") interface for communications over a PCIe bus. In at least one embodiment, I/O unit 506 implements interfaces for communicating with external devices.

In at least one embodiment, I/O unit 506 decodes packets received via system bus 502. In at least one embodiment, at least some packets represent commands configured to cause PPU 500 to perform various operations. In at least one embodiment, I/O unit 506 transmits decoded commands to various other units of PPU 500 as specified by commands. In at least one embodiment, commands are transmitted to front-end unit 510 and/or transmitted to hub 516 or other units of PPU 500 such as one or more copy engines, a video encoder, a video decoder, a power management unit, etc. (not explicitly illustrated in FIG. 5). In at least one embodiment, I/O unit 506 is configured to route communications between and among various logical units of PPU 500.

In at least one embodiment, a program executed by host processor encodes a command stream in a buffer that provides workloads to PPU 500 for processing. In at least one embodiment, a workload comprises instructions and data to be processed by those instructions. In at least one embodiment, a buffer is a region in a memory that is accessible (e.g., read/write) by both a host processor and PPU 500—a host interface unit may be configured to access that buffer in a system memory connected to system bus 502 via memory requests transmitted over system bus 502 by I/O unit 506. In at least one embodiment, a host processor writes a command stream to a buffer and then transmits a pointer to a start of a command stream to PPU 500 such that front-end unit 510 receives pointers to one or more command streams and manages one or more command streams, reading commands from command streams and forwarding commands to various units of PPU 500.

In at least one embodiment, front-end unit 510 is coupled to scheduler unit 512 that configures various GPCs 518 to process tasks defined by one or more command streams. In at least one embodiment, scheduler unit 512 is configured to track state information related to various tasks managed by scheduler unit 512 where state information may indicate which of GPCs 518 a task is assigned to, whether task is active or inactive, a priority level associated with task, and so forth. In at least one embodiment, scheduler unit 512 manages execution of a plurality of tasks on one or more of GPCs 518.

In at least one embodiment, scheduler unit 512 is coupled to work distribution unit 514 that is configured to dispatch tasks for execution on GPCs 518. In at least one embodiment, work distribution unit 514 tracks a number of scheduled tasks received from scheduler unit 512 and work distribution unit 514 manages a pending task pool and an active task pool for each of GPCs 518. In at least one embodiment, pending task pool comprises a number of slots (e.g., 32 slots) that contain tasks assigned to be processed by a particular GPC 518; an active task pool may comprise a number of slots (e.g., 4 slots) for tasks that are actively being processed by GPCs 518 such that as one of GPCs 518 completes execution of a task, that task is evicted from that active task pool for GPC 518 and another task from a pending task pool is selected and scheduled for execution on GPC 518. In at least one embodiment, if an active task is idle on GPC 518, such as while waiting for a data dependency to be resolved, then that active task is evicted from GPC 518 and returned to that pending task pool while another task in that pending task pool is selected and scheduled for execution on GPC 518.

In at least one embodiment, work distribution unit 514 communicates with one or more GPCs 518 via XBar 520. In at least one embodiment, XBar 520 is an interconnect network that couples many of units of PPU 500 to other units of PPU 500 and can be configured to couple work distribution unit 514 to a particular GPC 518. In at least one embodiment, one or more other units of PPU 500 may also be connected to XBar 520 via hub 516.

In at least one embodiment, tasks are managed by scheduler unit 512 and dispatched to one of GPCs 518 by work distribution unit 514. In at least one embodiment, GPC 518 is configured to process task and generate results. In at least one embodiment, results may be consumed by other tasks within GPC 518, routed to a different GPC 518 via XBar 520, or stored in memory 504. In at least one embodiment, results can be written to memory 504 via partition units 522, which implement a memory interface for reading and writing data to/from memory 504. In at least one embodiment, results can be transmitted to another PPU 500 or CPU via high-speed GPU interconnect 508. In at least one embodiment, PPU 500 includes a number U of partition units 522 that is equal to a number of separate and distinct memory devices 504 coupled to PPU 500, as described in more detail herein in conjunction with FIG. 28.

In at least one embodiment, a host processor executes a driver kernel that implements an application programming interface ("API") that enables one or more applications executing on a host processor to schedule operations for execution on PPU 500. In at least one embodiment, multiple compute applications are simultaneously executed by PPU 500 and PPU 500 provides isolation, quality of service ("QoS"), and independent address spaces for multiple compute applications. In at least one embodiment, an application generates instructions (e.g., in form of API calls) that cause a driver kernel to generate one or more tasks for execution by PPU 500 and that driver kernel outputs tasks to one or more streams being processed by PPU 500. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail in conjunction with FIG. 28.

Software compiler logic 150 may be used to perform software compilation operations associated with one or more embodiments, including generating and optimizing peeling loops to execute instructions on serial execution units. Details regarding software compiler logic 150 are provided herein in conjunction with FIG. 1. In at least one embodiment, software compiler logic 150 and the program code it may generate may be used in the system of FIG. 5 for performing software compilation operations, including generating and optimizing peeling loops to execute instructions on serial execution units, and executing instructions on serial execution units.

Figure 6:
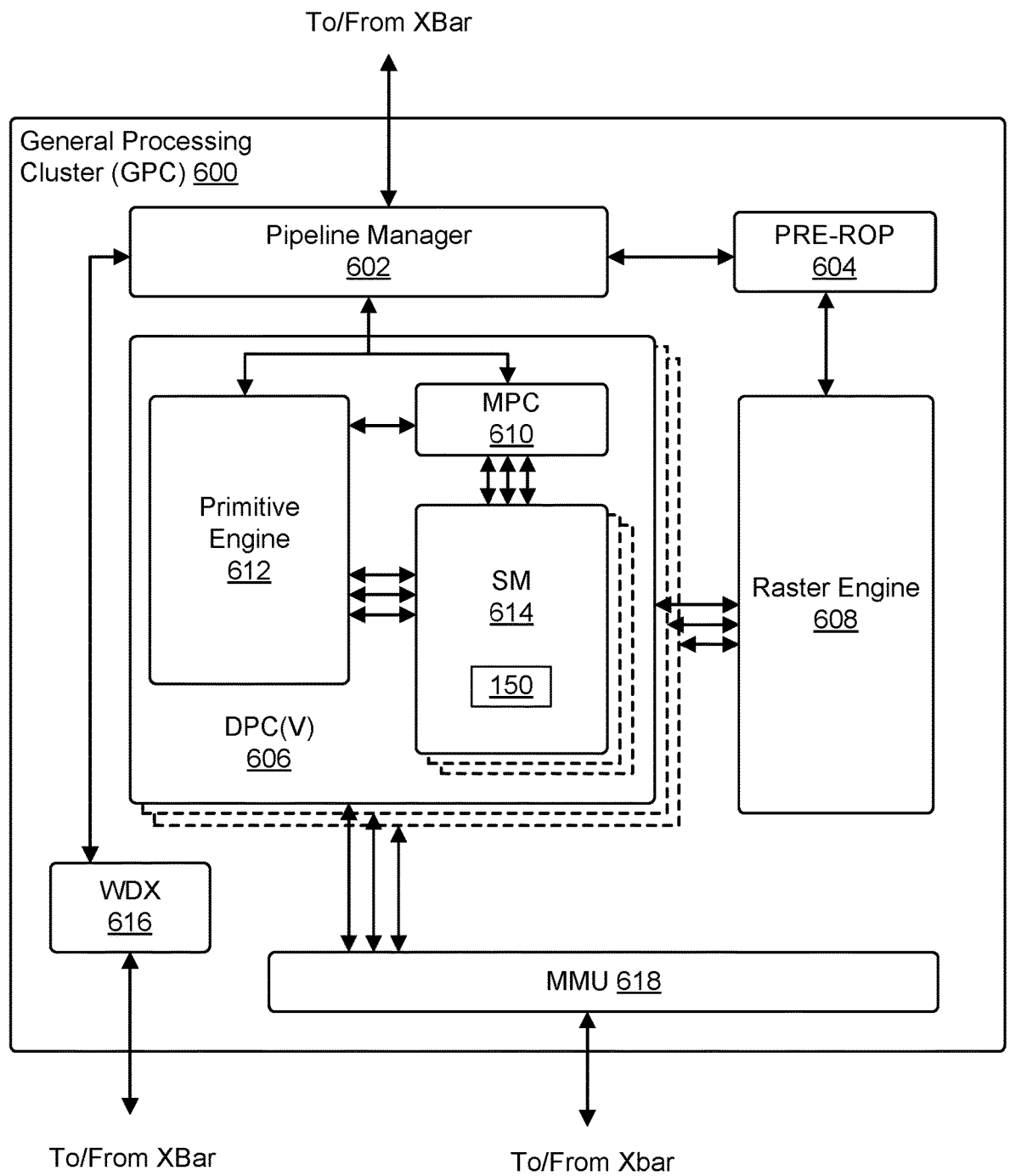
FIG. 6 illustrates a general processing cluster ("GPC"), according to at least one embodiment.

FIG. 6 illustrates a general processing cluster ("GPC") 600, according to at least one embodiment. In at least one embodiment, GPC 600 is GPC 518 of FIG. 5. In at least one embodiment, each GPC 600 includes a number of hardware units for processing tasks and each GPC 600 includes a pipeline manager 602, a pre-raster operations unit ("preROP") 604, a raster engine 608, a work distribution crossbar ("WDX") 616, a memory management unit ("MMU") 618, one or more Data Processing Clusters ("DPCs") 606, and any suitable combination of parts.

In at least one embodiment, operation of GPC 600 is controlled by pipeline manager 602. In at least one embodiment, pipeline manager 602 manages configuration of one or more DPCs 606 for processing tasks allocated to GPC 600. In at least one embodiment, pipeline manager 602 configures at least one of one or more DPCs 606 to implement at least a portion of a graphics rendering pipeline. In at least one embodiment, DPC 606 is configured to execute a vertex shader program on a programmable streaming multi-processor ("SM") 614. In at least one embodiment, pipeline manager 602 is configured to route packets received from a work distribution unit to appropriate logical units within GPC 600, in at least one embodiment, and some packets may be routed to fixed function hardware units in preROP 604 and/or raster engine 608 while other packets may be routed to DPCs 606 for processing by a primitive engine 612 or SM 614. In at least one embodiment, pipeline manager 602 configures at least one of DPCs 606 to implement a neural network model and/or a computing pipeline.

In at least one embodiment, preROP unit 604 is configured, in at least one embodiment, to route data generated by raster engine 608 and DPCs 606 to a Raster Operations ("ROP") unit in partition unit 522, described in more detail above in conjunction with FIG. 5. In at least one embodiment, preROP unit 604 is configured to perform optimizations for color blending, organize pixel data, perform address translations, and more. In at least one embodiment, raster engine 608 includes a number of fixed function hardware units configured to perform various raster operations, in at least one embodiment, and raster engine 608 includes a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to a coarse raster engine to generate coverage information (e.g., an x, y coverage mask for a tile) for primitive; output of a coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, an output of raster engine 608 comprises fragments to be processed by any suitable entity, such as by a fragment shader implemented within DPC 606.

In at least one embodiment, each DPC 606 included in GPC 600 comprises an M-Pipe Controller ("MPC") 610; primitive engine 612; one or more SMs 614; and any suitable combination thereof. In at least one embodiment, MPC 610 controls operation of DPC 606, routing packets received from pipeline manager 602 to appropriate units in DPC 606. In at least one embodiment, packets associated with a vertex are routed to primitive engine 612, which is configured to fetch vertex attributes associated with a vertex from memory; in contrast, packets associated with a shader program may be transmitted to SM 614.

In at least one embodiment, SM 614 comprises a programmable streaming processor that is configured to process tasks represented by a number of threads. In at least one embodiment, SM 614 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute a common set of instructions. In at least one embodiment, SM 614 implements a Single-Instruction, Multiple Thread ("SIMT") architecture wherein each thread in a group of threads is configured to process a different set of data based on that common set of instructions, but where individual threads in a group of threads are allowed to diverge during execution. In at least one embodiment, a program counter, call stack, and execution state is maintained for each warp, enabling concurrency between warps and serial execution within warps when threads within a warp diverge. In another embodiment, a program counter, call stack, and execution state is maintained for each individual thread, enabling equal concurrency between all threads, within and between warps. In at least one embodiment, execution state is maintained for each individual thread and threads executing common instructions may be converged and executed in parallel for better efficiency. At least one embodiment of SM 614 is described in more detail herein.

In at least one embodiment, MMU 618 provides an interface between GPC 600 and a memory partition unit (e.g., partition unit 522 of FIG. 5) and MMU 618 provides translation of virtual addresses into physical addresses, memory protection, and arbitration of memory requests. In at least one embodiment, MMU 618 provides one or more translation lookaside buffers ("TLBs") for performing translation of virtual addresses into physical addresses in memory.

Software compiler logic 150 may be used to perform software compilation operations associated with one or more embodiments, including generating and optimizing peeling loops to execute instructions on serial execution units. Details regarding software compiler logic 150 are provided herein in conjunction with FIG. 1. In at least one embodiment, software compiler logic 150 and the program code it may generate may be used in the system of FIG. 6 for performing software compilation operations, including generating and optimizing peeling loops to execute instructions on serial execution units, and executing instructions on serial execution units.

Figure 7:
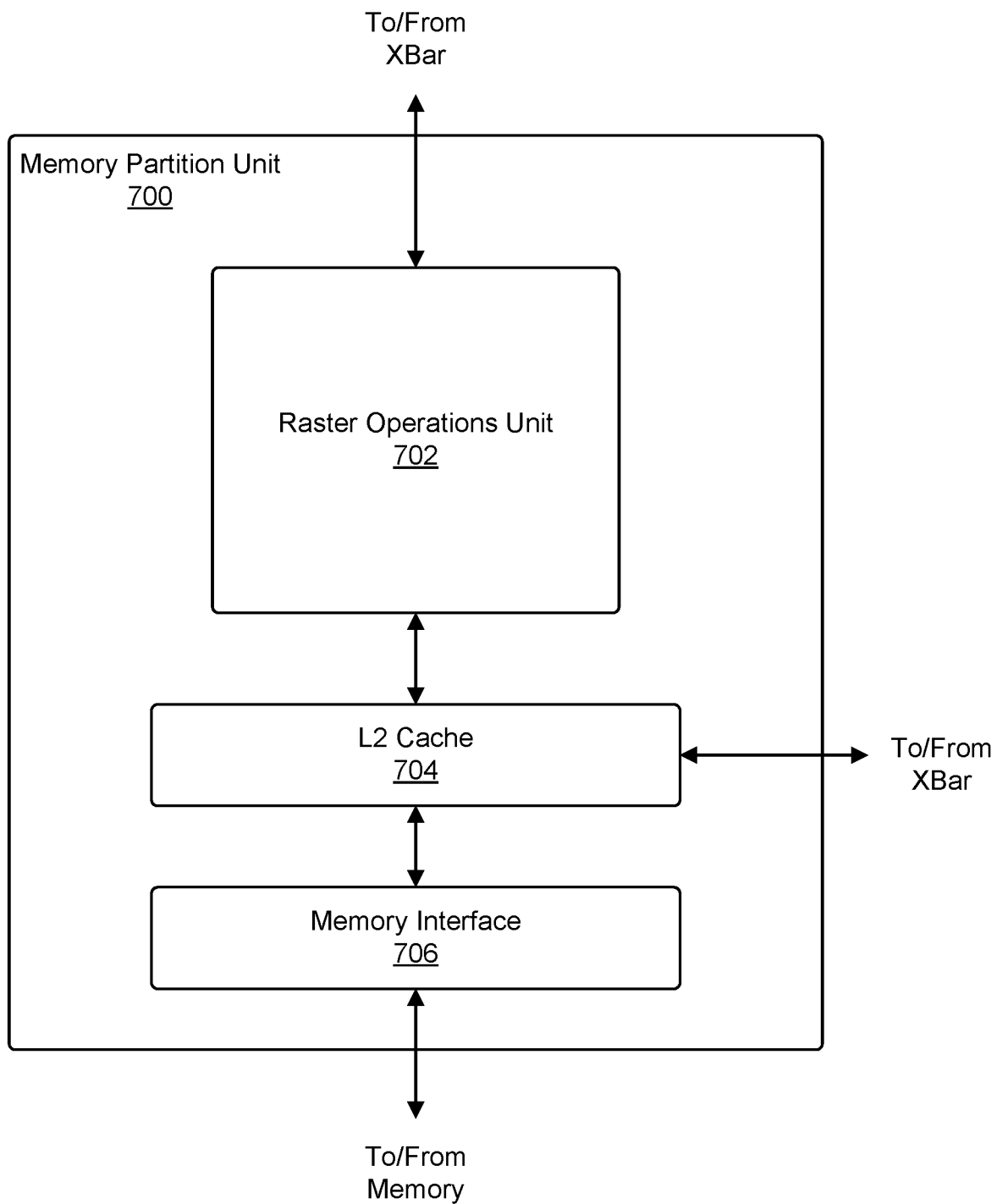
FIG. 7 illustrates a memory partition unit of a parallel processing unit ("PPU"), according to at least one embodiment.

FIG. 7 illustrates a memory partition unit 700 of a parallel processing unit ("PPU"), in accordance with at least one embodiment. In at least one embodiment, memory partition unit 700 includes a Raster Operations ("ROP") unit 702, a level two ("L2") cache 704, a memory interface 706, and any suitable combination thereof. In at least one embodiment, memory interface 706 is coupled to memory. In at least one embodiment, memory interface 706 may implement 32, 64, 17, 1024-bit data buses, or like, for high-speed data transfer. In at least one embodiment, PPU incorporates U memory interfaces 706 where U is a positive integer, with one memory interface 706 per pair of partition units 700, where each pair of partition units 700 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 706 implements a high bandwidth memory second generation ("HBM2") memory interface and Y equals half of U. In at least one embodiment, HBM2 memory stacks are located on a physical package with a PPU, providing substantial power and area savings compared with conventional GDDR5 SDRAM systems. In at least one embodiment, each HBM2 stack includes four memory dies with Y=4, with each HBM2 stack including two 128-bit channels per die for a total of 8 channels and a data bus width of 1024 bits. In at least one embodiment, that memory supports Single-Error Correcting Double-Error Detecting ("SECDED") Error Correction Code ("ECC") to protect data. In at least one embodiment, ECC can provide higher reliability for compute applications that are sensitive to data corruption.

In at least one embodiment, PPU implements a multi-level memory hierarchy. In at least one embodiment, memory partition unit 700 supports a unified memory to provide a single unified virtual address space for central processing unit ("CPU") and PPU memory, enabling data sharing between virtual memory systems. In at least one embodiment frequency of accesses by a PPU to a memory located on other processors is traced to ensure that memory pages are moved to physical memory of PPU that is accessing pages more frequently. In at least one embodiment, high-speed GPU interconnect 508 supports address translation services allowing PPU to directly access a CPU's page tables and providing full access to CPU memory by a PPU.

In at least one embodiment, copy engines transfer data between multiple PPUs or between PPUs and CPUs. In at least one embodiment, copy engines can generate page faults for addresses that are not mapped into page tables and memory partition unit 700 then services page faults, mapping addresses into page table, after which copy engine performs a transfer. In at least one embodiment, memory is pinned (e.g., non-pageable) for multiple copy engine operations between multiple processors, substantially reducing available memory. In at least one embodiment, with hardware page faulting, addresses can be passed to copy engines without regard as to whether memory pages are resident, and a copy process is transparent.

Data from memory 504 of FIG. 5 or other system memory is fetched by memory partition unit 700 and stored in L2 cache 704, which is located on-chip and is shared between various GPCs, in accordance with at least one embodiment. Each memory partition unit 700, in at least one embodiment, includes at least a portion of L2 cache associated with a corresponding memory device. In at least one embodiment, lower level caches are implemented in various units within GPCs. In at least one embodiment, each of SMs 614 in FIG. 6 may implement a Level 1 ("L1") cache wherein that L1 cache is private memory that is dedicated to a particular SM 614 and data from L2 cache 704 is fetched and stored in each L1 cache for processing in functional units of SMs 614. In at least one embodiment, L2 cache 704 is coupled to memory interface 706 and XBar 520 shown in FIG. 5.

ROP unit 702 performs graphics raster operations related to pixel color, such as color compression, pixel blending, and more, in at least one embodiment. ROP unit 702, in at least one embodiment, implements depth testing in conjunction with raster engine 608, receiving a depth for a sample location associated with a pixel fragment from a culling engine of raster engine 608. In at least one embodiment, depth is tested against a corresponding depth in a depth buffer for a sample location associated with a fragment. In at least one embodiment, if that fragment passes that depth test for that sample location, then ROP unit 702 updates depth buffer and transmits a result of that depth test to raster engine 608. It will be appreciated that a number of partition units 700 may be different than a number of GPCs and, therefore, each ROP unit 702 can, in at least one embodiment, be coupled to each GPC. In at least one embodiment, ROP unit 702 tracks packets received from different GPCs and determines whether a result generated by ROP unit 702 is to be routed to through XBar 520.

Figure 8:
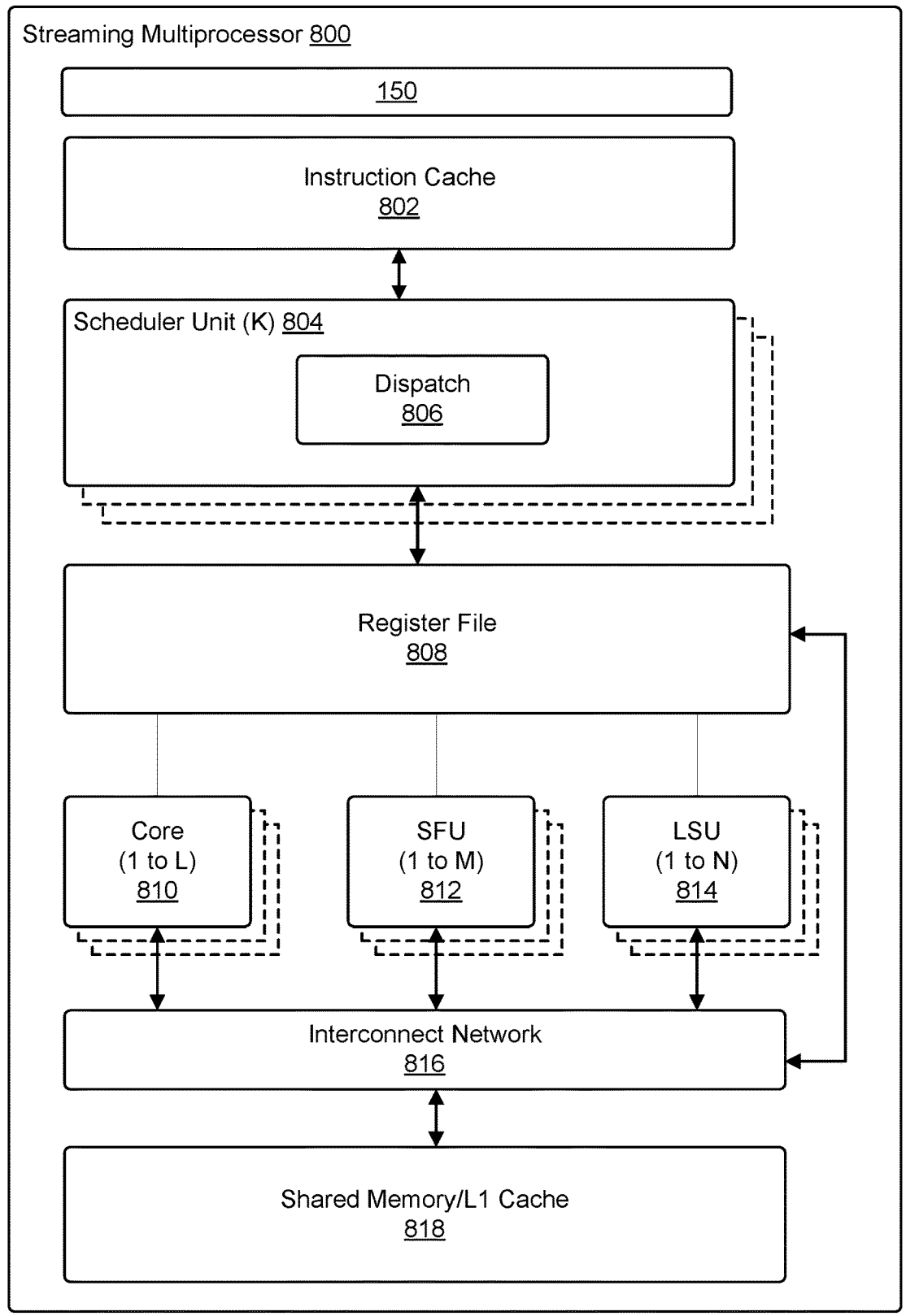
FIG. 8 illustrates a streaming multi-processor, according to at least one embodiment.

FIG. 8 illustrates a streaming multi-processor ("SM") 800, according to at least one embodiment. In at least one embodiment, SM 800 is SM of FIG. 6. In at least one embodiment, SM 800 includes an instruction cache 802, one or more scheduler units 804, a register 808, one or more processing cores ("cores") 810, one or more special function units ("SFUs") 812, one or more load/store units ("LSUs") 814, an interconnect network 816, a shared memory/level one ("L1") cache 818, and/or any suitable combination thereof.

In at least one embodiment, a work distribution unit dispatches tasks for execution on general processing clusters ("GPCs") of parallel processing units ("PPUs") and each task is allocated to a particular Data Processing Cluster ("DPC") within a GPC and, if a task is associated with a shader program, that task is allocated to one of SMs 800. In at least one embodiment, scheduler unit 804 receives tasks from a work distribution unit and manages instruction scheduling for one or more thread blocks assigned to SM 800. In at least one embodiment, scheduler unit 804 schedules thread blocks for execution as warps of parallel threads, wherein each thread block is allocated at least one warp. In at least one embodiment, each warp executes threads. In at least one embodiment, scheduler unit 804 manages a plurality of different thread blocks, allocating warps to different thread blocks and then dispatching instructions from plurality of different cooperative groups to various functional units (e.g., processing cores 810, SFUs 812, and LSUs 814) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (e.g., as small as a single thread) and multi-block granularities, and to perform collective operations such as synchronization on threads in a cooperative group. In at least one embodiment, that programming model supports clean composition across software boundaries, so that libraries and utility functions can synchronize safely within their local context without having to make assumptions about convergence. In at least one embodiment, Cooperative Groups primitives enable new patterns of cooperative parallelism, including producer-consumer parallelism, opportunistic parallelism, and global synchronization across an entire grid of thread blocks.

In at least one embodiment, a dispatch unit 806 is configured to transmit instructions to one or more functional units and scheduler unit 804 and includes two dispatch units 806 that enable two different instructions from a common warp to be dispatched during each clock cycle. In at least one embodiment, each scheduler unit 804 includes a single dispatch unit 806 or additional dispatch units 806.

In at least one embodiment, each SM 800, in at least one embodiment, includes register 808 that provides a set of registers for functional units of SM 800. In at least one embodiment, register 808 is divided between each functional unit such that each functional unit is allocated a dedicated portion of register 808. In at least one embodiment, register 808 is divided between different warps being executed by SM 800 and register 808 provides temporary storage for operands connected to data paths of functional units. In at least one embodiment, each SM 800 comprises a plurality of L processing cores 810, where L is a positive integer. In at least one embodiment, SM 800 includes a large number (e.g., 128 or more) of distinct processing cores 810. In at least one embodiment, each processing core 810 includes a fully-pipelined, single-precision, double-precision, and/or mixed precision processing unit that includes a floating point arithmetic logic unit and an integer arithmetic logic unit. In at least one embodiment, floating point arithmetic logic units implement IEEE 754-2008 standard for floating point arithmetic. In at least one embodiment, processing cores 810 include 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 810. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation, $D=A \times B+C$, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA 9 C++ API, exposes specialized matrix load, matrix multiply and accumulate, and matrix store operations to efficiently use tensor cores from a CUDA-C++ program. In at least one embodiment, at a CUDA level, a warp-level interface assumes 16×16 size matrices spanning all 32 threads of warp.

In at least one embodiment, each SM 800 comprises M SFUs 812 that perform special functions (e.g., attribute evaluation, reciprocal square root, and like). In at least one embodiment, SFUs 812 include a tree traversal unit configured to traverse a hierarchical tree data structure. In at least one embodiment, SFUs 812 include a texture unit configured to perform texture map filtering operations. In at least one embodiment, texture units are configured to load texture maps (e.g., a 2D array of texels) from memory and sample texture maps to produce sampled texture values for use in shader programs executed by SM 800. In at least one embodiment, texture maps are stored in shared memory/L1 cache 818. In at least one embodiment, texture units implement texture operations such as filtering operations using mip-maps (e.g., texture maps of varying levels of detail), in accordance with at least one embodiment. In at least one embodiment, each SM 800 includes two texture units.

Each SM 800 comprises N LSUs 814 that implement load and store operations between shared memory/L1 cache 818 and register 808, in at least one embodiment. Interconnect network 816 connects each functional unit to register 808 and LSU 814 to register 808 and shared memory/L1 cache 818 in at least one embodiment. In at least one embodiment, interconnect network 816 is a crossbar that can be configured to connect any functional units to any registers in register 808 and connect LSUs 814 to register 808 and memory locations in shared memory/L1 cache 818.

In at least one embodiment, shared memory/L1 cache 818 is an array of on-chip memory that allows for data storage and communication between SM 800 and primitive engine and between threads in SM 800, in at least one embodiment. In at least one embodiment, shared memory/L1 cache 818 comprises 128 KB of storage capacity and is in a path from SM 800 to a partition unit. In at least one embodiment, shared memory/L1 cache 818, in at least one embodiment, is used to cache reads and writes. In at least one embodiment, one or more of shared memory/L1 cache 818, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of a capacity, and texture and load/store operations can use remaining capacity. Integration within shared memory/L1 cache 818 enables shared memory/L1 cache 818 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In a general purpose parallel computation configuration, a work distribution unit assigns and distributes blocks of threads directly to DPCs, in at least one embodiment. In at least one embodiment, threads in a block execute a common program, using a unique thread ID in calculation to ensure each thread generates unique results, using SM 800 to execute program and perform calculations, shared memory/L1 cache 818 to communicate between threads, and LSU 814 to read and write global memory through shared memory/L1 cache 818 and memory partition unit. In at least one embodiment, when configured for general purpose parallel computation, SM 800 writes commands that scheduler unit 804 can use to launch new work on DPCs.

In at least one embodiment, a PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, a PPU is embodied on a single semiconductor substrate. In at least one embodiment, a PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, a PPU may be included on a graphics card that includes one or more memory devices. In at least one embodiment, that graphics card may be configured to interface with a PCIe slot on a motherboard of a desktop computer. In at least one embodiment, that PPU may be an integrated graphics processing unit ("iGPU") included in chipset of a motherboard.

Software compiler logic 150 may be used to perform software compilation operations associated with one or more embodiments, including generating and optimizing peeling loops to execute instructions on serial execution units. Details regarding software compiler logic 150 are provided herein in conjunction with FIG. 1. In at least one embodiment, software compiler logic 150 and the program code it may generate may be used in the system of FIG. 8 for performing software compilation operations, including generating and optimizing peeling loops to execute instructions on serial execution units, and executing instructions on serial execution units.

Figure 9:
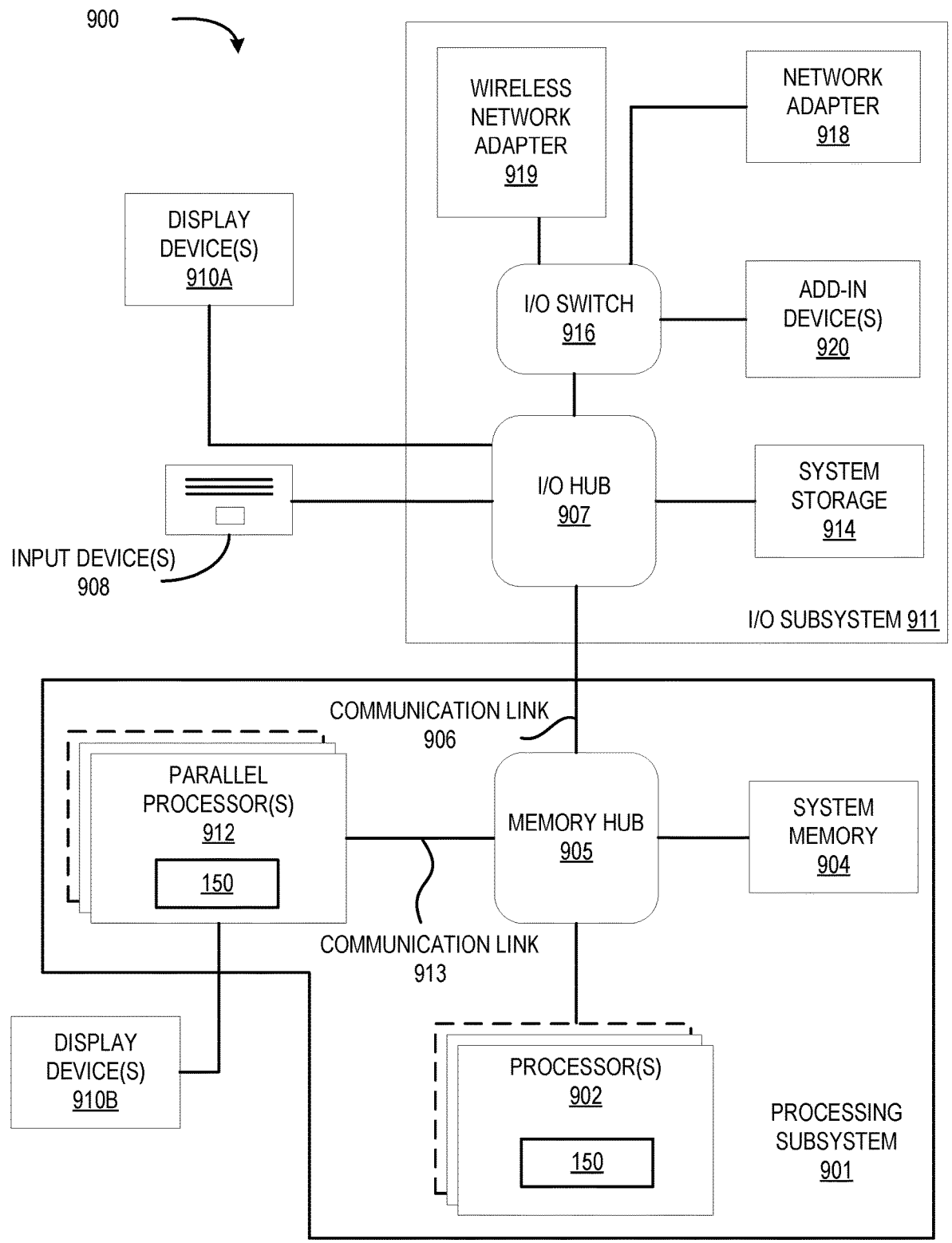
FIG. 9 illustrates a computer system, according to at least one embodiment.

FIG. 9 is a block diagram illustrating a computing system 900 according to at least one embodiment. In at least one embodiment, computing system 900 includes a processing subsystem 901 having one or more processor(s) 902 and a system memory 904 communicating via an interconnection path that may include a memory hub 905. In at least one embodiment, memory hub 905 may be a separate component within a chipset component or may be integrated within one or more processor(s) 902. In at least one embodiment, memory hub 905 couples with an I/O subsystem 911 via a communication link 906. In at least one embodiment, I/O subsystem 911 includes an I/O hub 907 that can enable computing system 900 to receive input from one or more input device(s) 908. In at least one embodiment, I/O hub 907 can enable a display controller, which may be included in one or more processor(s) 902, to provide outputs to one or more display device(s) 910A. In at least one embodiment, one or more display device(s) 910A coupled with I/O hub 907 can include a local, internal, or embedded display device.

In at least one embodiment, processing subsystem 901 includes one or more parallel processor(s) 912 coupled to memory hub 905 via a bus or other communication link 913. In at least one embodiment, communication link 913 may use one of any number of standards based communication link technologies or protocols, such as, but not limited to PCI Express, or may be a vendor-specific communications interface or communications fabric. In at least one embodiment, one or more parallel processor(s) 912 form a computationally focused parallel or vector processing system that can include a large number of processing cores and/or processing clusters, such as a many-integrated core (MIC) processor. In at least one embodiment, some or all of parallel processor(s) 912 form a graphics processing subsystem that can output pixels to one of one or more display device(s) 910A coupled via I/O Hub 907. In at least one embodiment, parallel processor(s) 912 can also include a display controller and display interface (not shown) to enable a direct connection to one or more display device(s) 910B.

In at least one embodiment, a system storage unit 914 can connect to I/O hub 907 to provide a storage mechanism for computing system 900. In at least one embodiment, an I/O switch 916 can be used to provide an interface mechanism to enable connections between I/O hub 907 and other components, such as a network adapter 918 and/or a wireless network adapter 919 that may be integrated into platform, and various other devices that can be added via one or more add-in device(s) 920. In at least one embodiment, network adapter 918 can be an Ethernet adapter or another wired network adapter. In at least one embodiment, wireless network adapter 919 can include one or more of a Wi-Fi, Bluetooth, near field communication (NFC), or other network device that includes one or more wireless radios.

In at least one embodiment, computing system 900 can include other components not explicitly shown, including USB or other port connections, optical storage drives, video capture devices, and like, may also be connected to I/O hub 907. In at least one embodiment, communication paths interconnecting various components in FIG. 9 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 912 incorporate circuitry optimized for graphics and video processing, including, for example, video output circuitry, and constitutes a graphics processing unit (GPU). In at least one embodiment, parallel processor(s) 912 incorporate circuitry optimized for general purpose processing. In at least one embodiment, components of computing system 900 may be integrated with one or more other system elements on a single integrated circuit. For example, in at least one embodiment, parallel processor(s) 912, memory hub 905, processor(s) 902, and I/O hub 907 can be integrated into a system on chip (SoC) integrated circuit. In at least one embodiment, components of computing system 900 can be integrated into a single package to form a system in package (SIP) configuration. In at least one embodiment, at least a portion of components of computing system 900 can be integrated into a multi-chip module (MCM), which can be interconnected with other multi-chip modules into a modular computing system.

Software compiler logic 150 may be used to perform software compilation operations associated with one or more embodiments, including generating and optimizing peeling loops to execute instructions on serial execution units. Details regarding software compiler logic 150 are provided herein in conjunction with FIG. 1. In at least one embodiment, software compiler logic 150 and the program code it may generate may be used in the system of FIG. 9 for performing software compilation operations, including generating and optimizing peeling loops to execute instructions on serial execution units, and executing instructions on serial execution units.

Figure 10A:
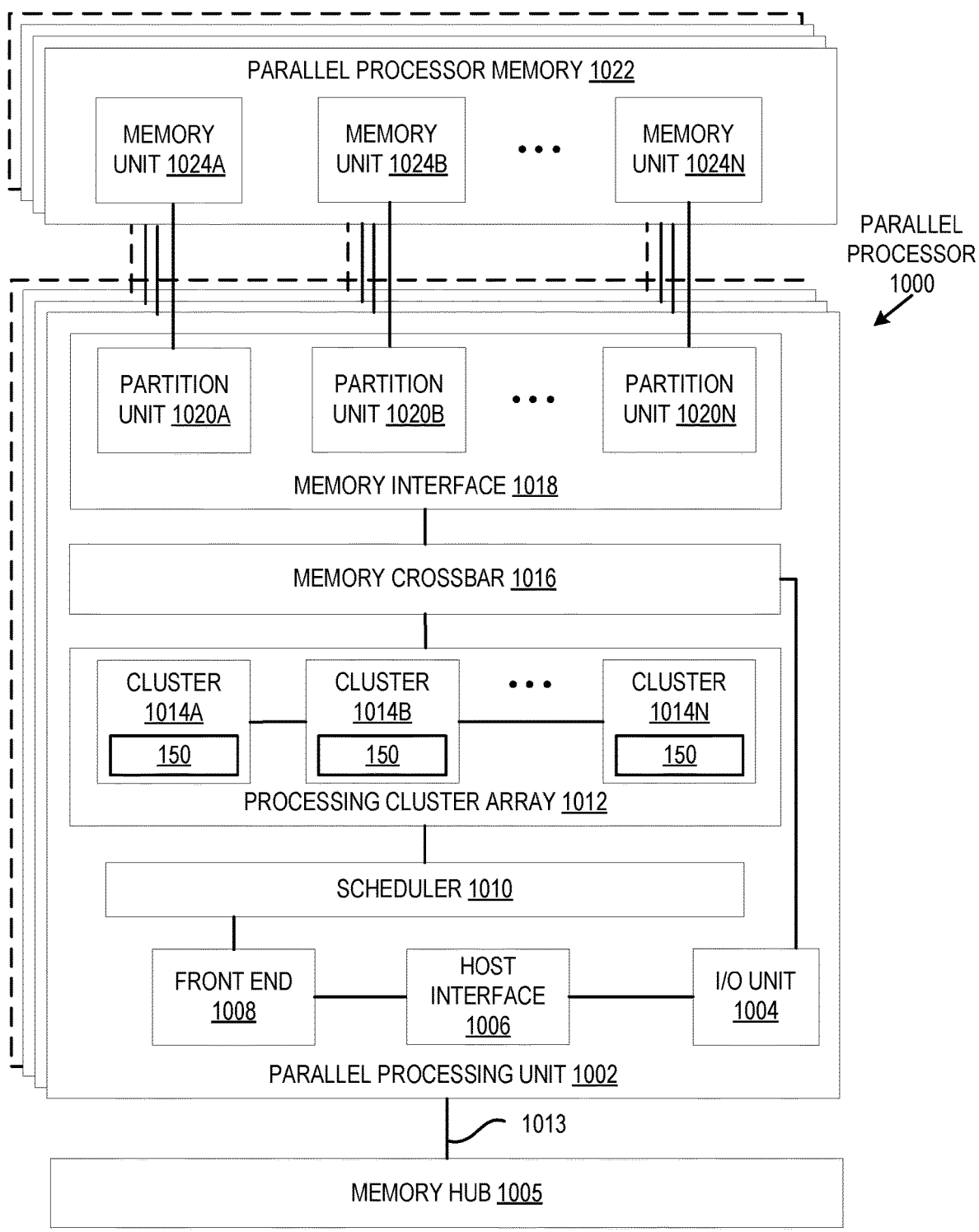
FIG. 10A illustrates a parallel processor, according to at least one embodiment.

FIG. 10A illustrates a parallel processor 1000 according to at least one embodiment. In at least one embodiment, various components of parallel processor 1000 may be implemented using one or more integrated circuit devices, such as programmable processors, application specific integrated circuits (ASICs), or field programmable gate arrays (FPGA). In at least one embodiment, illustrated parallel processor 1000 is a variant of the one or more parallel processor(s) 912 shown in FIG. 9.

In at least one embodiment, parallel processor 1000 includes a parallel processing unit 1002. In at least one embodiment, parallel processing unit 1002 includes an I/O unit 1004 that enables communication with other devices, including other instances of parallel processing unit 1002. In at least one embodiment, I/O unit 1004 may be directly connected to other devices. In at least one embodiment, I/O unit 1004 connects with other devices via use of a hub or switch interface, such as a memory hub 1005. In at least one embodiment, connections between memory hub 1005 and I/O unit 1004 form a communication link 1013. In at least one embodiment, I/O unit 1004 connects with a host interface 1006 and a memory crossbar 1016, where host interface 1006 receives commands directed to performing processing operations and memory crossbar 1016 receives commands directed to performing memory operations.

In at least one embodiment, when host interface 1006 receives a command buffer via I/O unit 1004, host interface 1006 can direct operations to perform those commands to a front end 1008. In at least one embodiment, front end 1008 couples with a scheduler 1010, which is configured to distribute commands or other work items to a processing cluster array 1012. In at least one embodiment, scheduler 1010 ensures that processing cluster array 1012 is properly configured and in a valid state before tasks are distributed to a cluster of processing cluster array 1012. In at least one embodiment, scheduler 1010 is implemented via firmware logic executing on a microcontroller. In at least one embodiment, microcontroller implemented scheduler 1010 is configurable to perform complex scheduling and work distribution operations at coarse and fine granularity, e.g., enabling rapid preemption and context switching of threads executing on processing array 1012. In at least one embodiment, host software can prove workloads for scheduling on processing cluster array 1012 via one of multiple graphics processing paths. In at least one embodiment, workloads can then be automatically distributed across processing array cluster 1012 by scheduler 1010 logic within a microcontroller including scheduler 1010.

In at least one embodiment, processing cluster array 1012 can include up to "N" processing clusters (e.g., cluster 1014A, cluster 1014B, through cluster 1014N), where "N" represents a positive integer (which may be a different integer "N" than used in other figures). In at least one embodiment, each cluster 1014A-1014N of processing cluster array 1012 can execute a large number of concurrent threads. In at least one embodiment, scheduler 1010 can allocate work to clusters 1014A-1014N of processing cluster array 1012 using various scheduling and/or work distribution algorithms, which may vary depending on workload arising for each type of program or computation. In at least one embodiment, scheduling can be handled dynamically by scheduler 1010, or can be assisted in part by compiler logic during compilation of program logic configured for execution by processing cluster array 1012. In at least one embodiment, different clusters 1014A-1014N of processing cluster array 1012 can be allocated for processing different types of programs or for performing different types of computations.

In at least one embodiment, processing cluster array 1012 can be configured to perform various types of parallel processing operations. In at least one embodiment, processing cluster array 1012 is configured to perform general-purpose parallel compute operations. For example, in at least one embodiment, processing cluster array 1012 can include logic to execute processing tasks including filtering of video and/or audio data, performing modeling operations, including physics operations, and performing data transformations.

In at least one embodiment, processing cluster array 1012 is configured to perform parallel graphics processing operations. In at least one embodiment, processing cluster array 1012 can include additional logic to support execution of such graphics processing operations, including but not limited to, texture sampling logic to perform texture operations, as well as tessellation logic and other vertex processing logic. In at least one embodiment, processing cluster array 1012 can be configured to execute graphics processing related shader programs, for example, such as vertex shaders, tessellation shaders, geometry shaders, and pixel shaders. In at least one embodiment, parallel processing unit 1002 can transfer data from system memory via I/O unit 1004 for processing. In at least one embodiment, during processing, transferred data can be stored to on-chip memory (e.g., parallel processor memory 1022) during processing, then written back to system memory.

In at least one embodiment, when parallel processing unit 1002 is used to perform graphics processing, scheduler 1010 can be configured to divide a processing workload into approximately equal sized tasks, to better enable distribution of graphics processing operations to multiple clusters 1014A-1014N of processing cluster array 1012. In at least one embodiment, portions of processing cluster array 1012 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 1014A-1014N may be stored in buffers to allow intermediate data to be transmitted between clusters 1014A-1014N for further processing.

In at least one embodiment, processing cluster array 1012 can receive processing tasks to be executed via scheduler 1010, which receives commands defining processing tasks from front end 1008. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 1010 may be configured to fetch indices corresponding to tasks or may receive indices from front end 1008. In at least one embodiment, front end 1008 can be configured to ensure processing cluster array 1012 is configured to a valid state before a workload specified by incoming command buffers (e.g., batch-buffers, push buffers, etc.) is initiated.

In at least one embodiment, each of one or more instances of parallel processing unit 1002 can couple with a parallel processor memory 1022. In at least one embodiment, parallel processor memory 1022 can be accessed via memory crossbar 1016, which can receive memory requests from processing cluster array 1012 as well as I/O unit 1004. In at least one embodiment, memory crossbar 1016 can access parallel processor memory 1022 via a memory interface 1018. In at least one embodiment, memory interface 1018 can include multiple partition units (e.g., partition unit 1020A, partition unit 1020B, through partition unit 1020N) that can each couple to a portion (e.g., memory unit) of parallel processor memory 1022. In at least one embodiment, a number of partition units 1020A-1020N is configured to be equal to a number of memory units, such that a first partition unit 1020A has a corresponding first memory unit 1024A, a second partition unit 1020B has a corresponding memory unit 1024B, and an N-th partition unit 1020N has a corresponding N-th memory unit 1024N. In at least one embodiment, a number of partition units 1020A-1020N may not be equal to a number of memory units.

In at least one embodiment, memory units 1024A-1024N can include various types of memory devices, including dynamic random access memory (DRAM) or graphics random access memory, such as synchronous graphics random access memory (SGRAM), including graphics double data rate (GDDR) memory. In at least one embodiment, memory units 1024A-1024N may also include 3D stacked memory, including but not limited to high bandwidth memory (HBM). In at least one embodiment, render targets, such as frame buffers or texture maps may be stored across memory units 1024A-1024N, allowing partition units 1020A-1020N to write portions of each render target in parallel to efficiently use available bandwidth of parallel processor memory 1022. In at least one embodiment, a local instance of parallel processor memory 1022 may be excluded in favor of a unified memory design that utilizes system memory in conjunction with local cache memory.

In at least one embodiment, any one of clusters 1014A-1014N of processing cluster array 1012 can process data that will be written to any of memory units 1024A-1024N within parallel processor memory 1022. In at least one embodiment, memory crossbar 1016 can be configured to transfer an output of each cluster 1014A-1014N to any partition unit 1020A-1020N or to another cluster 1014A-1014N, which can perform additional processing operations on an output. In at least one embodiment, each cluster 1014A-1014N can communicate with memory interface 1018 through memory crossbar 1016 to read from or write to various external memory devices. In at least one embodiment, memory crossbar 1016 has a connection to memory interface 1018 to communicate with I/O unit 1004, as well as a connection to a local instance of parallel processor memory 1022, enabling processing units within different processing clusters 1014A-1014N to communicate with system memory or other memory that is not local to parallel processing unit 1002. In at least one embodiment, memory crossbar 1016 can use virtual channels to separate traffic streams between clusters 1014A-1014N and partition units 1020A-1020N.

In at least one embodiment, multiple instances of parallel processing unit 1002 can be provided on a single add-in card, or multiple add-in cards can be interconnected. In at least one embodiment, different instances of parallel processing unit 1002 can be configured to interoperate even if different instances have different numbers of processing cores, different amounts of local parallel processor memory, and/or other configuration differences. For example, in at least one embodiment, some instances of parallel processing unit 1002 can include higher precision floating point units relative to other instances. In at least one embodiment, systems incorporating one or more instances of parallel processing unit 1002 or parallel processor 1000 can be implemented in a variety of configurations and form factors, including but not limited to desktop, laptop, or handheld personal computers, servers, workstations, game consoles, and/or embedded systems.

Figure 10B:
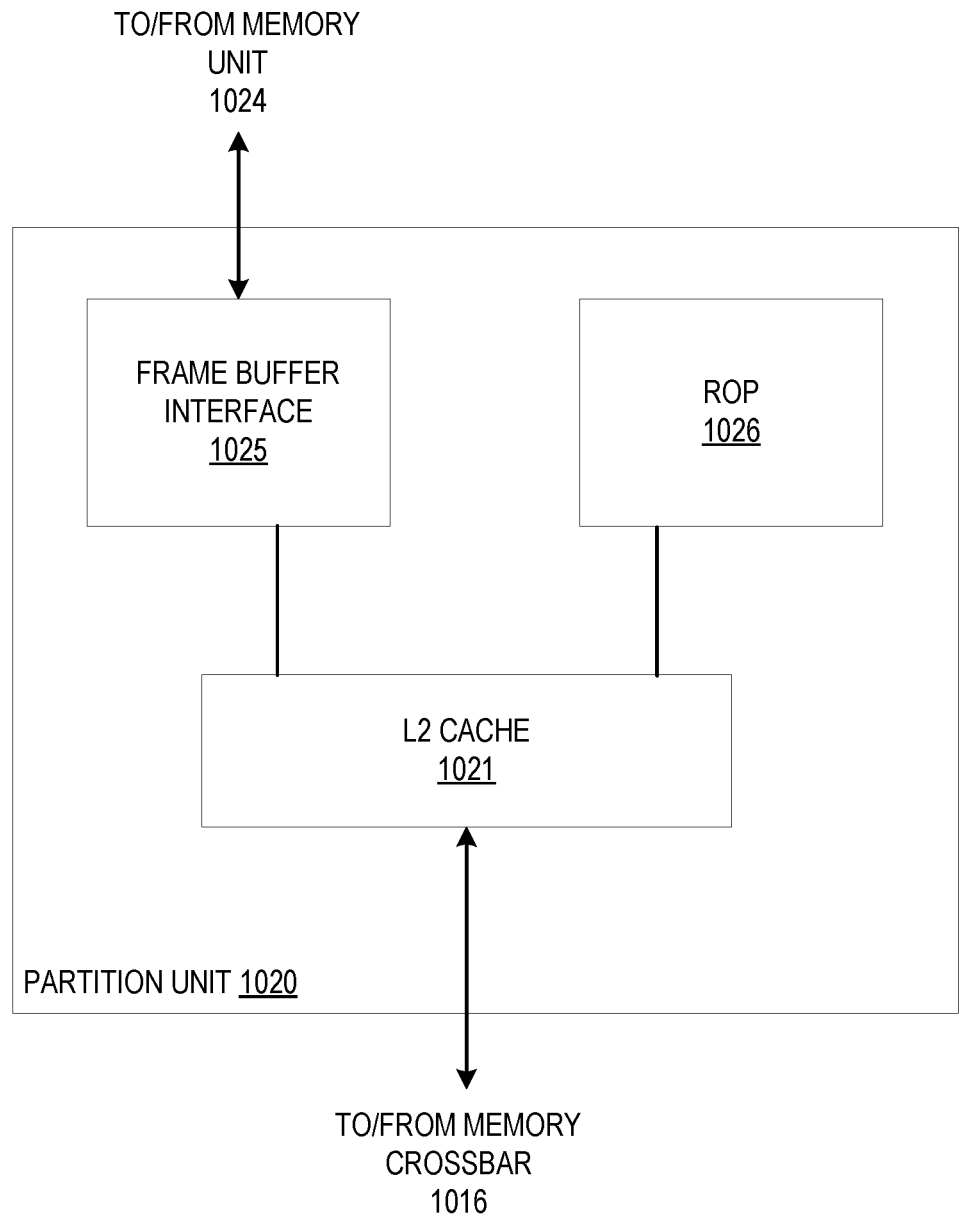
FIG. 10B illustrates a partition unit, according to at least one embodiment.

FIG. 10B is a block diagram of a partition unit 1020 according to at least one embodiment. In at least one embodiment, partition unit 1020 is an instance of one of partition units 1020A-1020N of FIG. 10A. In at least one embodiment, partition unit 1020 includes an L2 cache 1021, a frame buffer interface 1025, and a ROP 1026 (raster operations unit). In at least one embodiment, L2 cache 1021 is a read/write cache that is configured to perform load and store operations received from memory crossbar 1016 and ROP 1026. In at least one embodiment, read misses and urgent write-back requests are output by L2 cache 1021 to frame buffer interface 1025 for processing. In at least one embodiment, updates can also be sent to a frame buffer via frame buffer interface 1025 for processing. In at least one embodiment, frame buffer interface 1025 interfaces with one of memory units in parallel processor memory, such as memory units 1024A-1024N of FIG. 10 (e.g., within parallel processor memory 1022).

In at least one embodiment, ROP 1026 is a processing unit that performs raster operations such as stencil, z test, blending, etc. In at least one embodiment, ROP 1026 then outputs processed graphics data that is stored in graphics memory. In at least one embodiment, ROP 1026 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 1026 can vary based on statistical characteristics of data to be compressed. For example, in at least one embodiment, delta color compression is performed on depth and color data on a per-tile basis.

In at least one embodiment, ROP 1026 is included within each processing cluster (e.g., cluster 1014A-1014N of FIG. 10A) instead of within partition unit 1020. In at least one embodiment, read and write requests for pixel data are transmitted over memory crossbar 1016 instead of pixel fragment data. In at least one embodiment, processed graphics data may be displayed on a display device, such as one of one or more display device(s) 910 of FIG. 9, routed for further processing by processor(s) 902, or routed for further processing by one of processing entities within parallel processor 1000 of FIG. 10A.

Figure 10C:
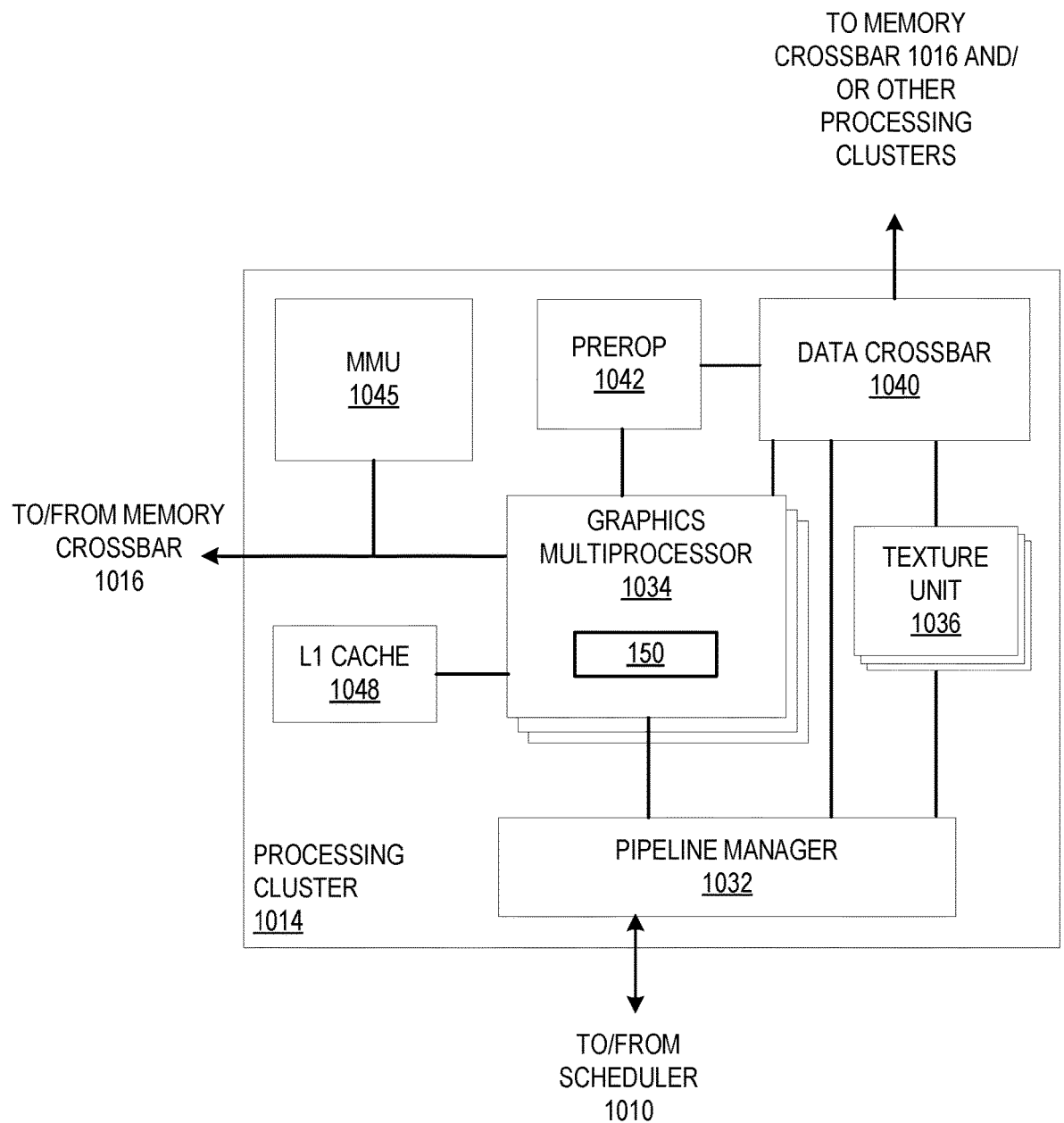
FIG. 10C illustrates a processing cluster, according to at least one embodiment.

FIG. 10C is a block diagram of a processing cluster 1014 within a parallel processing unit according to at least one embodiment. In at least one embodiment, a processing cluster is an instance of one of processing clusters 1014A-1014N of FIG. 10A. In at least one embodiment, processing cluster 1014 can be configured to execute many threads in parallel, where "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 1014 can be controlled via a pipeline manager 1032 that distributes processing tasks to SIMT parallel processors. In at least one embodiment, pipeline manager 1032 receives instructions from scheduler 1010 of FIG. 10A and manages execution of those instructions via a graphics multiprocessor 1034 and/or a texture unit 1036. In at least one embodiment, graphics multiprocessor 1034 is an exemplary instance of a SIMT parallel processor. However, in at least one embodiment, various types of SIMT parallel processors of differing architectures may be included within processing cluster 1014. In at least one embodiment, one or more instances of graphics multiprocessor 1034 can be included within a processing cluster 1014. In at least one embodiment, graphics multiprocessor 1034 can process data and a data crossbar 1040 can be used to distribute processed data to one of multiple possible destinations, including other shader units. In at least one embodiment, pipeline manager 1032 can facilitate distribution of processed data by specifying destinations for processed data to be distributed via data crossbar 1040.

In at least one embodiment, each graphics multiprocessor 1034 within processing cluster 1014 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 1014 constitute a thread. In at least one embodiment, a set of threads executing across a set of parallel processing engines is a thread group. In at least one embodiment, a thread group executes a common program on different input data. In at least one embodiment, each thread within a thread group can be assigned to a different processing engine within a graphics multiprocessor 1034. In at least one embodiment, a thread group may include fewer threads than a number of processing engines within graphics multiprocessor 1034. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 1034. In at least one embodiment, when a thread group includes more threads than number of processing engines within graphics multiprocessor 1034, processing can be performed over consecutive clock cycles. In at least one embodiment, multiple thread groups can be executed concurrently on a graphics multiprocessor 1034.

In at least one embodiment, graphics multiprocessor 1034 includes an internal cache memory to perform load and store operations. In at least one embodiment, graphics multiprocessor 1034 can forego an internal cache and use a cache memory (e.g., L1 cache 1048) within processing cluster 1014. In at least one embodiment, each graphics multiprocessor 1034 also has access to L2 caches within partition units (e.g., partition units 1020A-1020N of FIG. 10A) that are shared among all processing clusters 1014 and may be used to transfer data between threads. In at least one embodiment, graphics multiprocessor 1034 may also access off-chip global memory, which can include one or more of local parallel processor memory and/or system memory. In at least one embodiment, any memory external to parallel processing unit 1002 may be used as global memory. In at least one embodiment, processing cluster 1014 includes multiple instances of graphics multiprocessor 1034 and can share common instructions and data, which may be stored in L1 cache 1048.

In at least one embodiment, each processing cluster 1014 may include an MMU 1045 (memory management unit) that is configured to map virtual addresses into physical addresses. In at least one embodiment, one or more instances of MMU 1045 may reside within memory interface 1018 of FIG. 10A. In at least one embodiment, MMU 1045 includes a set of page table entries (PTEs) used to map a virtual address to a physical address of a tile and optionally a cache line index. In at least one embodiment, MMU 1045 may include address translation lookaside buffers (TLB) or caches that may reside within graphics multiprocessor 1034 or L1 1048 cache or processing cluster 1014. In at least one embodiment, a physical address is processed to distribute surface data access locally to allow for efficient request interleaving among partition units. In at least one embodiment, a cache line index may be used to determine whether a request for a cache line is a hit or miss.

In at least one embodiment, a processing cluster 1014 may be configured such that each graphics multiprocessor 1034 is coupled to a texture unit 1036 for performing texture mapping operations, e.g., determining texture sample positions, reading texture data, and filtering texture data. In at least one embodiment, texture data is read from an internal texture L1 cache (not shown) or from an L1 cache within graphics multiprocessor 1034 and is fetched from an L2 cache, local parallel processor memory, or system memory, as needed. In at least one embodiment, each graphics multiprocessor 1034 outputs processed tasks to data crossbar 1040 to provide processed task to another processing cluster 1014 for further processing or to store processed task in an L2 cache, local parallel processor memory, or system memory via memory crossbar 1016. In at least one embodiment, a preROP 1042 (pre-raster operations unit) is configured to receive data from graphics multiprocessor 1034, and direct data to ROP units, which may be located with partition units as described herein (e.g., partition units 1020A-1020N of FIG. 10A). In at least one embodiment, preROP 1042 unit can perform optimizations for color blending, organizing pixel color data, and performing address translations.

Software compiler logic 150 may be used to perform software compilation operations associated with one or more embodiments, including generating and optimizing peeling loops to execute instructions on serial execution units. Details regarding software compiler logic 150 are provided herein in conjunction with FIG. 1. In at least one embodiment, software compiler logic 150 and the program code it may generate may be used in the system of FIG. 10C for performing software compilation operations, including generating and optimizing peeling loops to execute instructions on serial execution units, and executing instructions on serial execution units.

Figure 10D:
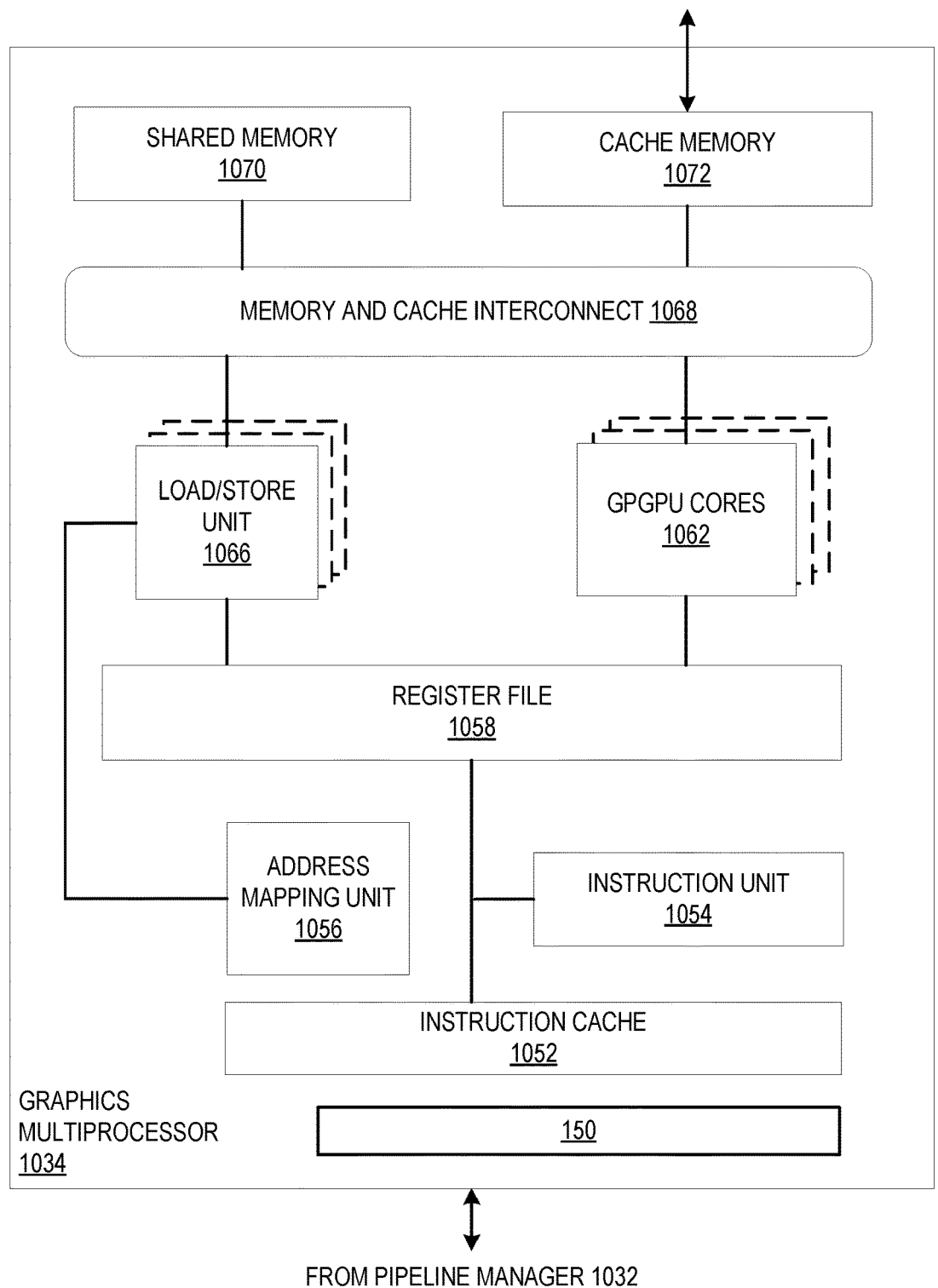
FIG. 10D illustrates a graphics multiprocessor, according to at least one embodiment.

FIG. 10D shows a graphics multiprocessor 1034 according to at least one embodiment. In at least one embodiment, graphics multiprocessor 1034 couples with pipeline manager 1032 of processing cluster 1014. In at least one embodiment, graphics multiprocessor 1034 has an execution pipeline including but not limited to an instruction cache 1052, an instruction unit 1054, an address mapping unit 1056, a register 1058, one or more general purpose graphics processing unit (GPGPU) cores 1062, and one or more load/store units 1066. In at least one embodiment, GPGPU cores 1062 and load/store units 1066 are coupled with cache memory 1072 and shared memory 1070 via a memory and cache interconnect 1068.

In at least one embodiment, instruction cache 1052 receives a stream of instructions to execute from pipeline manager 1032. In at least one embodiment, instructions are cached in instruction cache 1052 and dispatched for execution by an instruction unit 1054. In at least one embodiment, instruction unit 1054 can dispatch instructions as thread groups (e.g., warps), with each thread of thread group assigned to a different execution unit within GPGPU cores 1062. In at least one embodiment, an instruction can access any of a local, shared, or global address space by specifying an address within a unified address space. In at least one embodiment, address mapping unit 1056 can be used to translate addresses in a unified address space into a distinct memory address that can be accessed by load/store units 1066.

In at least one embodiment, register 1058 provides a set of registers for functional units of graphics multiprocessor 1034. In at least one embodiment, register 1058 provides temporary storage for operands connected to data paths of functional units (e.g., GPGPU cores 1062, load/store units 1066) of graphics multiprocessor 1034. In at least one embodiment, register 1058 is divided between each of functional units such that each functional unit is allocated a dedicated portion of register 1058. In at least one embodiment, register 1058 is divided between different warps being executed by graphics multiprocessor 1034.

In at least one embodiment, GPGPU cores 1062 can each include floating point units (FPUs) and/or integer arithmetic logic units (ALUs) that are used to execute instructions of graphics multiprocessor 1034. In at least one embodiment, GPGPU cores 1062 can be similar in architecture or can differ in architecture. In at least one embodiment, a first portion of GPGPU cores 1062 include a single precision FPU and an integer ALU while a second portion of GPGPU cores include a double precision FPU. In at least one embodiment, FPUs can implement IEEE 754-2008 standard floating point arithmetic or enable variable precision floating point arithmetic. In at least one embodiment, graphics multiprocessor 1034 can additionally include one or more fixed function or special function units to perform specific functions such as copy rectangle or pixel blending operations. In at least one embodiment, one or more of GPGPU cores 1062 can also include fixed or special function logic.

In at least one embodiment, GPGPU cores 1062 include SIMD logic capable of performing a single instruction on multiple sets of data. In at least one embodiment, GPGPU cores 1062 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 1068 is an interconnect network that connects each functional unit of graphics multiprocessor 1034 to register 1058 and to shared memory 1070. In at least one embodiment, memory and cache interconnect 1068 is a crossbar interconnect that allows load/store unit 1066 to implement load and store operations between shared memory 1070 and register 1058. In at least one embodiment, register 1058 can operate at a same frequency as GPGPU cores 1062, thus data transfer between GPGPU cores 1062 and register 1058 can have very low latency. In at least one embodiment, shared memory 1070 can be used to enable communication between threads that execute on functional units within graphics multiprocessor 1034. In at least one embodiment, cache memory 1072 can be used as a data cache for example, to cache texture data communicated between functional units and texture unit 1036. In at least one embodiment, shared memory 1070 can also be used as a program managed cache. In at least one embodiment, threads executing on GPGPU cores 1062 can programmatically store data within shared memory in addition to automatically cached data that is stored within cache memory 1072.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high-speed interconnect such as PCIe or NVLink). In at least one embodiment, a GPU may be integrated on a package or chip as cores and communicatively coupled to cores over an internal processor bus/interconnect internal to a package or chip. In at least one embodiment, regardless a manner in which a GPU is connected, processor cores may allocate work to such GPU in a form of sequences of commands/instructions contained in a work descriptor. In at least one embodiment, that GPU then uses dedicated circuitry/logic for efficiently processing these commands/instructions.

Software compiler logic 150 may be used to perform software compilation operations associated with one or more embodiments, including generating and optimizing peeling loops to execute instructions on serial execution units. Details regarding software compiler logic 150 are provided herein in conjunction with FIG. 1. In at least one embodiment, software compiler logic 150 and the program code it may generate may be used in the system of FIG. 10D for performing software compilation operations, including generating and optimizing peeling loops to execute instructions on serial execution units, and executing instructions on serial execution units.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor comprising:
a parallel execution unit; and
a serial execution unit,
wherein the processor operates to:
select a set of one or more threads from a group of active threads associated with an instruction;
copy a source operand value associated with a thread of the set of one or more threads from a first private register to a first shared register to obtain a shared source operand; and
execute the instruction for the set of one or more threads using the serial execution unit and based at least on the shared source operand.

2. The processor of claim 1, wherein the set of one or more threads are selected based at least on the set of one or more threads having a common source operand value.

3. The processor of claim 2, wherein the processor further operates to:
select, from the set of one or more threads, a subset of one or more threads having an additional common source operand value; and
execute the instruction for the subset of one or more threads using the serial execution unit.

4. The processor of claim 2, wherein the processor further operates to:
copy the common source operand value from a second private register to a second shared register to obtain a second shared source operand;
execute the instruction for the set of one or more threads using the serial execution unit and based at least on the second shared source operand; and
store a result in a destination shared register.

5. The processor of claim 4, wherein the processor further operates to:
select, from a remaining group of active threads associated with the instruction that are not included in the set of one or more threads, another set of one or more threads having another common source operand value;
copy the another common source operand value from another private register to another shared register to obtain a third shared source operand;
execute the instruction on the serial execution unit based at least on the third shared source operand; and
store another result in another destination shared register.

6. The processor of claim 4, wherein the processor further operates to:
copy the result to a destination private register for at least one individual thread of the set of one or more threads.

7. The processor of claim 1, wherein the set of one or more threads includes a single thread, and wherein the processor further operates to:
store a result in a destination shared register.

8. The processor of claim 7, wherein the processor further operates to:
select another thread from a remaining group of active threads associated with the instruction;
copy another source operand value of the another thread from another private register to another shared register to obtain another shared source operand; and
execute the instruction for the another thread using the serial execution unit and based at least on the another shared source operand.

9. The processor of claim 1, wherein the processor further operates to:
execute a different instruction for at least one active thread of the group of active threads using the parallel execution unit.

10. The processor of claim 1, wherein the processor is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system for generating or presenting at least one of augmented reality content, virtual reality content, or mixed reality content;
a system for hosting one or more real-time streaming applications;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

11. A system comprising:
one or more processing units to:
replace an instruction associated with a group of threads and corresponding to a parallel execution unit with one or more instructions to:
select, from the group of threads, a set of one or more threads having a common source operand value;
copy the common source operand value associated with a thread of the set of one or more threads from a private register to a shared register to obtain a shared source operand; and
execute the instruction for the set of one or more threads using a serial execution unit and based at least on the shared source operand.

12. The system of claim 11, wherein the one or more instructions are further to:
store a result in a shared destination register.

13. The system of claim 11, wherein the one or more instructions are further to:
select another thread from a remaining group of active threads not included in the set of one or more threads;
copy another source operand value of the another thread from another private register to another shared register to obtain another shared source operand; and
execute the instruction for the another thread on the serial execution unit using the another shared source operand.

14. The system of claim 11, wherein the group of threads is identified using a predicate mask, and wherein the predicate mask is a predicate guard or a source operand for at least one instruction of the one or more instructions.

15. The system of claim 14, wherein the one or more instructions are further to:
initialize the predicate mask with an inherited predicate of the instruction.

16. The system of claim 14, wherein the one or more instructions are further to:
update the predicate mask to indicate that the instruction is no longer pending execution for the set of one or more threads.

17. The system of claim 11, wherein the one or more processing units are further to:
analyze a program code including the instruction to determine a likelihood of data uniformity with respect to a set of source operands of the instruction; and
responsive to a determination that the likelihood satisfies a threshold criteria, replace the instruction with the one or more instructions.

18. The system of claim 11, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system for generating or presenting at least one of augmented reality content, virtual reality content, or mixed reality content;
a system for hosting one or more real-time streaming applications;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

19. A method comprising:
copying a same operand value associated with a set of one or more threads from a private register to a shared register to obtain a shared source operand; and
executing, using a serial execution unit, an instruction associated with the set of one or more threads based at least on the same operand value being associated with the set of one or more threads.

20. The method of claim 19, further comprising:
setting one or more predicate flags corresponding to the set of one or more threads; and
causing, based at least on the one or more predicate flags, the set of one or more threads to refrain from executing the instruction with respect to the same operand value.

* * * * *